US008650338B2

(12) United States Patent
Blocksome et al.

(10) Patent No.: US 8,650,338 B2
(45) Date of Patent: *Feb. 11, 2014

(54) FENCING DIRECT MEMORY ACCESS DATA TRANSFERS IN A PARALLEL ACTIVE MESSAGING INTERFACE OF A PARALLEL COMPUTER

(71) Applicant: International Business Machines Corporation, Armonk, NY (US)

(72) Inventors: Michael A. Blocksome, Rochester, MN (US); Amith R. Mamidala, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,198

(22) Filed: Mar. 4, 2013

(65) Prior Publication Data

US 2013/0185465 A1 Jul. 18, 2013

Related U.S. Application Data

(63) Continuation of application No. 12/940,300, filed on Nov. 5, 2010, now Pat. No. 8,527,672.

(51) Int. Cl.
*G06F 13/28* (2006.01)
*G06F 15/00* (2006.01)
*G06F 7/38* (2006.01)

(52) U.S. Cl.
USPC ................................ 710/22; 712/10; 712/225

(58) Field of Classification Search
None
See application file for complete search history.

(56) References Cited

U.S. PATENT DOCUMENTS

| 4,893,303 | A | 1/1990 | Nakamura |
| 5,488,608 | A | 1/1996 | Flammer, III |
| 5,802,278 | A | 9/1998 | Isfeld et al. |
| 6,337,852 | B1 | 1/2002 | Desnoyers et al. |
| 6,438,748 | B1 | 8/2002 | Gard et al. |
| 6,519,310 | B2 | 2/2003 | Chapple |
| 6,553,002 | B1 | 4/2003 | Bremer et al. |
| 6,553,031 | B1 | 4/2003 | Nakamura et al. |
| 6,591,310 | B1 | 7/2003 | Johnson |

(Continued)

OTHER PUBLICATIONS

Knudson, B., et al., "IBM System Blue Gene Solution: Blue Gene/P Application Development," IBM Redbooks, Aug. 2009, pp. 1-406, Fourth Edition, International Technical Support Organization, Rochester, Minnesota.

(Continued)

*Primary Examiner* — Idriss N Alrobaye
*Assistant Examiner* — Richard B Franklin
(74) *Attorney, Agent, or Firm* — Biggers Kennedy Lenart Spraggins, LLP

(57) ABSTRACT

Fencing direct memory access ('DMA') data transfers in a parallel active messaging interface ('PAMI') of a parallel computer, the PAMI including data communications endpoints, each endpoint including specifications of a client, a context, and a task, the endpoints coupled for data communications through the PAMI and through DMA controllers operatively coupled to segments of shared random access memory through which the DMA controllers deliver data communications deterministically, including initiating execution through the PAMI of an ordered sequence of active DMA instructions for DMA data transfers between two endpoints, effecting deterministic DMA data transfers through a DMA controller and a segment of shared memory; and executing through the PAMI, with no FENCE accounting for DMA data transfers, an active FENCE instruction, the FENCE instruction completing execution only after completion of all DMA instructions initiated prior to execution of the FENCE instruction for DMA data transfers between the two endpoints.

18 Claims, 16 Drawing Sheets

(56) References Cited

U.S. PATENT DOCUMENTS

| | | |
|---|---|---|
| 6,601,089 B1 | 7/2003 | Sistare et al. |
| 6,801,927 B1 | 10/2004 | Smith et al. |
| 6,847,991 B1 | 1/2005 | Kurapati |
| 6,993,769 B2 | 1/2006 | Simonson et al. |
| 7,155,560 B2 | 12/2006 | McGrew et al. |
| 7,237,036 B2 | 6/2007 | Boucher et al. |
| 7,328,300 B2 | 2/2008 | Bennett |
| 7,392,352 B2 | 6/2008 | Mithal et al. |
| 7,418,470 B2 | 8/2008 | Howard et al. |
| 7,464,138 B2 | 12/2008 | Le et al. |
| 7,533,197 B2 | 5/2009 | Leonard et al. |
| 7,552,312 B2 | 6/2009 | Archer et al. |
| 7,673,011 B2 | 3/2010 | Archer et al. |
| 7,991,978 B2 | 8/2011 | Kuesel et al. |
| 8,001,280 B2 | 8/2011 | Blumrich et al. |
| 8,018,951 B2 | 9/2011 | Blocksome |
| 8,041,969 B2 | 10/2011 | Archer et al. |
| 8,250,164 B2 | 8/2012 | Archer et al. |
| 8,286,188 B1 | 10/2012 | Brief |
| 2002/0054051 A1 | 5/2002 | Ladd |
| 2003/0093485 A1 | 5/2003 | Dougall et al. |
| 2003/0195991 A1 | 10/2003 | Masel et al. |
| 2005/0166209 A1 | 7/2005 | Merrick et al. |
| 2005/0289235 A1 | 12/2005 | Suematsu et al. |
| 2006/0059257 A1 | 3/2006 | Collard et al. |
| 2006/0101104 A1 | 5/2006 | Bhanot et al. |
| 2006/0182128 A1 | 8/2006 | Nakata et al. |
| 2006/0227774 A1 | 10/2006 | Hoenicke |
| 2007/0078997 A1 | 4/2007 | Stern |
| 2007/0124453 A1 | 5/2007 | Slaughter et al. |
| 2007/0169179 A1 | 7/2007 | Narad |
| 2008/0101295 A1 | 5/2008 | Tomita et al. |
| 2008/0126739 A1 | 5/2008 | Archer et al. |
| 2008/0281998 A1 | 11/2008 | Archer et al. |
| 2009/0003344 A1 | 1/2009 | Kumar |
| 2009/0006808 A1 | 1/2009 | Blumrich et al. |
| 2009/0006810 A1 | 1/2009 | Almasi et al. |
| 2009/0007141 A1 | 1/2009 | Blocksome et al. |
| 2009/0022156 A1 | 1/2009 | Blocksome |
| 2009/0037377 A1 | 2/2009 | Archer et al. |
| 2009/0089670 A1 | 4/2009 | Gooding et al. |
| 2009/0129277 A1 | 5/2009 | Supalov et al. |
| 2009/0138892 A1 | 5/2009 | Almasi et al. |
| 2009/0254920 A1 | 10/2009 | Truschin et al. |
| 2010/0005189 A1 | 1/2010 | Archer et al. |
| 2010/0058356 A1 | 3/2010 | Aho et al. |
| 2010/0232448 A1 | 9/2010 | Sugumar et al. |
| 2011/0314255 A1 | 12/2011 | Krishna et al. |
| 2012/0079035 A1 | 3/2012 | Archer et al. |
| 2012/0079133 A1 | 3/2012 | Archer et al. |
| 2012/0117137 A1 | 5/2012 | Blocksome et al. |
| 2012/0117138 A1 | 5/2012 | Blocksome et al. |
| 2012/0117211 A1 | 5/2012 | Blocksome et al. |
| 2012/0117281 A1 | 5/2012 | Blocksome et al. |
| 2012/0137294 A1 | 5/2012 | Archer et al. |
| 2012/0144400 A1 | 6/2012 | Davis et al. |
| 2012/0144401 A1 | 6/2012 | Faraj |
| 2012/0151485 A1 | 6/2012 | Archer et al. |
| 2012/0179736 A1 | 7/2012 | Blocksome et al. |
| 2012/0179760 A1 | 7/2012 | Blocksome et al. |
| 2012/0185679 A1 | 7/2012 | Archer et al. |
| 2012/0185873 A1 | 7/2012 | Archer et al. |
| 2012/0210094 A1 | 8/2012 | Blocksome et al. |
| 2012/0254344 A1 | 10/2012 | Archer et al. |
| 2013/0061244 A1 | 3/2013 | Davis et al. |
| 2013/0061245 A1 | 3/2013 | Faraj |
| 2013/0067111 A1 | 3/2013 | Archer et al. |
| 2013/0067206 A1 | 3/2013 | Archer et al. |
| 2013/0073751 A1 | 3/2013 | Blocksome et al. |
| 2013/0074097 A1 | 3/2013 | Archer et al. |
| 2013/0081059 A1 | 3/2013 | Archer et al. |
| 2013/0091510 A1 | 4/2013 | Archer et al. |
| 2013/0097263 A1 | 4/2013 | Blocksome et al. |
| 2013/0097404 A1 | 4/2013 | Blocksome et al. |
| 2013/0097614 A1 | 4/2013 | Blocksome et al. |
| 2013/0110901 A1 | 5/2013 | Blocksome et al. |
| 2013/0117403 A1 | 5/2013 | Archer et al. |
| 2013/0117761 A1 | 5/2013 | Archer et al. |
| 2013/0117764 A1 | 5/2013 | Archer et al. |
| 2013/0124666 A1 | 5/2013 | Archer et al. |
| 2013/0125135 A1 | 5/2013 | Archer et al. |
| 2013/0125140 A1 | 5/2013 | Archer et al. |
| 2013/0174180 A1 | 7/2013 | Blocksome et al. |
| 2013/0185465 A1 | 7/2013 | Blocksome |

OTHER PUBLICATIONS

Blocksome, M., et al., "Optimizing MPI Collectives using Efficient Intra-node Communication Techniques over the BlueGene/P Supercomputer," Computer Science IBM Research Report, Dec. 2010, pp. 1-25, IBM Systems and Technology Group, Rochester, Minnesota.
Office Action, U.S. Appl. No. 12/892,153, Jun. 1, 2012, pp. 1-10.
Office Action, U.S. Appl. No. 12/940,300, Sep. 19, 2012, pp. 1-12.
Foster et al., Managing Multiple Communication Method in High-Performance Networked Computing Systems. http://www.mcs.anl.gov/nexus, 1997, pp. 1-25.
Robinson et al., "A Task Migration Implementation of the Message-Passing Interface", May 1996, IEEE, HPDC-5'96, pp. 61-68.
A Message Passing Interface for Parallel and Distributed Computing, Hairi et al., 1993, pp. 1-8.
Introduction to Parallel Computing and the Message Passing Interface (MPI), Kuiper, 2008, pp. 1-39.
Parallel net DCF A High-Performance Scientific I/O Interface, Li et al., 2003, pp. 1-11.
HPSS MPI-IO: A Standard Parallel Interface to HPSS File System, Loewe, 2001, pp. 1-19.
Notice of Allowance, U.S. Appl. No. 12/959,455, Mar. 1, 2013.
Notice of Allowance, U.S. Appl. No. 12/959,539, Mar. 6, 2013.
Office Action, U.S. Appl. No. 13/007,860, Mar. 19, 2013.
Office Action, U.S. Appl. No. 12/963,671, Mar. 1, 2013.
Office Action, U.S. Appl. No. 12/940,198, Feb. 14, 2013.
Office Action, U.S. Appl. No. 12/940,282, Feb. 5, 2013.
Notice of Allowance, U.S. Appl. No. 13/290,670, Mar. 27, 2013.
Office Action, U.S. Appl. No. 13/668,503, Feb. 13, 2013.
Office Action, U.S. Appl. No. 13/673,188, Mar. 5, 2013.
Office Action, U.S. Appl. No. 13/678,799, Feb. 5, 2013.
Office Action, U.S. Appl. No. 13/681,903, Apr. 2, 2013.
Office Action, U.S. Appl. No. 13/709,305, Mar. 25, 2013.
Office Action, U.S. Appl. No. 13/711,108, Mar. 22, 2013.
Blocksome, Michael; "Optimizing MPI Collectives using Efficient Intra-node Communication Techniques over the BlueGene/P Supercomputer," *Computer Science IBM Research Report*, Dec. 2010.
Kumar et al., "The Deep Computing Messaging Framework: Generalized Scalable Message Passing Blue Gene/P Supercomputer", Proceedings of the 22nd Annual International Conference On Supercomputing (ICS '08), Jun. 2008, pp. 94-103, ACM New York, USA.
Banikazemi et al., "MPI-LAPI: An Efficient Implementation of MPI for IBM RS/6000 SP Systems", IEEE Transactions on Parallel and Distributed Systems, Oct. 2001, vol. 12, Issue 10, pp. 1081-1093, IEEE Xplore Digital Library (online publication), IEEE.org, USA, DOI: 10.1109/71.963419.
Myricom, "Myrinet Express (MX): A High-Performance, Low-Level, Message-Passing Interface for Myrinet", Myricom.com (online publication), Version 1.2, Oct. 2006, pp. 1-65, Myricom Inc., USA.
Dinan et al., "Hybrid Parallel Programming With MPI And Unified Parallel C", Proceedings Of The 7th ACM International Conference On Computing Frontiers (CF'10), May 2010, pp. 177-186, ACM New York, USA.
Dozsa et al., "Enabling Concurrent Multithreaded MPI Communication On Multicore Petascale Systems", Proceedings Of The 17th European MPI Users' Group Meeting Conference On Recent Advances In The Message Passing Interface (EuroMPI'10), Apr. 2010, pp. 11-20 (reprinted pp. 1-9), Springer-Verlag Berlin, Heidelberg.

(56) References Cited

OTHER PUBLICATIONS

Foster et al., "Managing Multiple Communication Methods in High-Performance Networked Computing Systems", Journal of Parallel and Distributed Computing, vol. 40, Issue 1, Jan. 1997, pp. 1-25, (online publication), ScienceDirect.com, USA.
Robinson et al., "A Task Migration Implementation of the Message-Passing Interface", Proceedings of the 5th IEEE International Symposium on High Performance Distributed Computing (HPDC'96), May 1996, pp. 61-68, IEEE Computer Society, Washington DC, USA.
Final Office Action, U.S. Appl. No. 12/892,192, May 2, 2013, 1-25.
Office Action, U.S. Appl. No. 12/892,192, Sep. 30, 2013, 1-15.
Notice of Allowance, U.S. Appl. No. 13/007,860, Jul. 3, 2013, 1-08.
Office Action, U.S. Appl. No. 12/892,153, Apr. 25, 2013, 1-14.
Final Office Action, U.S. Appl. No. 12/892,153, Aug. 14, 2013, 1-09.
Office Action, U.S. Appl. No. 12/985,611, Aug. 2, 2013, 1-23.
Office Action, U.S. Appl. No. 13/007,848, May 15, 2013, 1-25.
Final Office Action, U.S. Appl. No. 13/007,848, Sep. 13, 2013, 1-24.
Notice of Allowance, U.S. Appl. No. 12/963,671, Sep. 18, 2013, 1-16.
Final Office Action, U.S. Appl. No. 12/940,198, Aug. 14, 2013, 1-16.
Final Office Action, U.S. Appl. No. 12/940,259, Aug. 14, 2013, 1-20.
Final Office Action, U.S. Appl. No. 12/940,282, Sep. 10, 2013, 1-17.
Notice of Allowance, U.S. Appl. No. 12/940,300, Apr. 29, 2013, 1-11.
Notice of Allowance, U.S. Appl. No. 12/963,694, Jun. 18, 2013, 1-21.
Office Action, U.S. Appl. No. 12/985,651, Aug. 5, 2013, 1-19.
Notice of Allowance, U.S. Appl. No. 13/290,670, Mar. 27, 2013, 1-19.
Notice of Allowance, U.S. Appl. No. 13/290,642, May 1, 2013, 1-24.
Office Action, U.S. Appl. No. 13/292,293, Jul. 19, 2013, 1-36.
Office Action, U.S. Appl. No. 13/659,370, Oct. 21, 2013, 1-22.
Final Office Action, U.S. Appl. No. 13/668,503, Jul. 11, 2013, 1-26.
Office Action, U.S. Appl. No. 13/671,762, May 13, 2013, 1-22.
Final Office Action, U.S. Appl. No. 13/671,762, Sep. 13, 2013, 1-21.
Office Action, U.S. Appl. No. 13/673,188, Jul. 25, 2013, 1-26.
Final Office Action, U.S. Appl. No. 13/678,799, Aug. 30, 2013, 1-17.
Final Office Action, U.S. Appl. No. 13/677,507, Aug. 22, 2013, 1-21.
Office Action, U.S. Appl. No. 13/676,700, Jun. 5, 2013, 1-31.
Office Action, U.S. Appl. No. 13/690,168, Aug. 15, 2013, 1-30.
Notice of Allowance, U.S. Appl. No. 13/681,903, Sep. 30, 2013, 1-18.
Office Action, U.S. Appl. No. 13/680,772, Aug. 15, 2013, 1-31.
Office Action, U.S. Appl. No. 13/710,066, Jul. 19, 2013, 1-36.
Notice of Allowance, U.S. Appl. No. 13/709,305, Aug. 27, 2013, 1-19.
Final Office Action, U.S. Appl. No. 13/711,108, Jul. 5, 2013, 1-34.
Notice of Allowance, U.S. Appl. No. 13/711,108, Sep. 19, 2013, 1-17.
Notice of Allowance, U.S. Appl. No. 13/784,198, Sep. 20, 2013, 1-11.
Final Office Action, U.S. Appl. No. 12/956,903, Nov. 6, 2013, 1-20.
Notice of Allowance, U.S. Appl. No. 13/292,293, Nov. 7, 2013, 1-20.
Hariri, S., et al., "A Message Passing Interface for Parallel and Distributed Computing," Proceedings the 2nd International Symposium on High Performance Distributed Computing, 1993., Jul. 20-23, 1993, pp. 84-91, Conference Publications, Spokane, WA, USA, IEEE Xplore. DOI: 10.1109/HPDC.1993.263854.

FENCING DIRECT MEMORY ACCESS DATA TRANSFERS IN A PARALLEL ACTIVE MESSAGING INTERFACE OF A PARALLEL COMPUTER

CROSS-REFERENCE TO RELATED APPLICATION

This application is a continuation application of and claims priority from U.S. patent application Ser. No. 12/940,300, filed on Nov. 5, 2010.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for fencing data transfers in a parallel active messaging interface (PAMI) of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same application (split up and specially adapted) on multiple processors in order to obtain results faster. Parallel computing is based on the fact that the process of solving a problem usually can be divided into smaller jobs, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing jobs via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

One-sided message passing is a way to transmit information without active participation from a communications target, and FENCE instructions and protocols advise applications of completion of particular sequences of data communications instructions. Traditional FENCE protocols, however, are artifacts of application-level messaging modules, two-sided, inefficient, burdensome, difficult to implement. Existing FENCE protocols, for example, employ FENCE accounting with large counter arrays to guarantee the validity of FENCE operations. Readers will recognize that much of the usefulness of parallel operations, such as FENCE operations, is processing control on massively parallel machines, 'supercomputers,' with possibly thousands of compute nodes, millions of data communications endpoints each of which sends to all others, and therefore trillions of messages, so that such traditional FENCE accounting would require maintenance of huge counter arrays.

Parallel compute nodes, even in supercomputers, typically have limited on-board memory, so that large arrays of completion counters simply cannot scale. IBM's next-generation Blue Gene™ supercomputer, for example, supports on the order of a million communications endpoints, although each hardware process will have assigned to it only 250 MB of RAM, much too much of which would be occupied by any attempt at traditional FENCE accounting with counter arrays. Another inefficiency in traditional FENCE operations is that acknowledgement packets, even for one-sided operations, lead very quickly to excessive network congestion and poor latency even for one-sided operations, easily to be seen in a supercomputer setting with a few trillion messages in flight.

SUMMARY OF THE INVENTION

Methods, apparatus, and computer program products for fencing direct memory access ('DMA') data transfers in a parallel active messaging interface ('PAMI') of a parallel computer, the parallel computer including a plurality of compute nodes that execute a parallel application, the PAMI including data communications endpoints, each endpoint including a specification of data communications parameters for a thread of execution on a compute node, including specifications of a client, a context, and a task, the compute nodes and the endpoints coupled for data communications through the PAMI and through data communications resources including DMA controllers operatively coupled to segments of shared random access memory through which the DMA controllers deliver data communications deterministically, in the same order in which the communications are transmitted, including initiating execution through the PAMI of an ordered sequence of active DMA instructions for DMA data transfers between two endpoints, an origin endpoint and a target endpoint, each DMA instruction effecting a deterministic DMA data transfer through a DMA controller and a segment of shared memory in which the DMA data transfers are effected according to the ordered sequence of the DMA instructions; and executing through the PAMI, with no FENCE accounting for DMA data transfers, an active FENCE instruction, the FENCE instruction completing execution only after completion of all DMA instructions initiated prior to execution of the FENCE instruction for DMA data transfers between the two endpoints.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
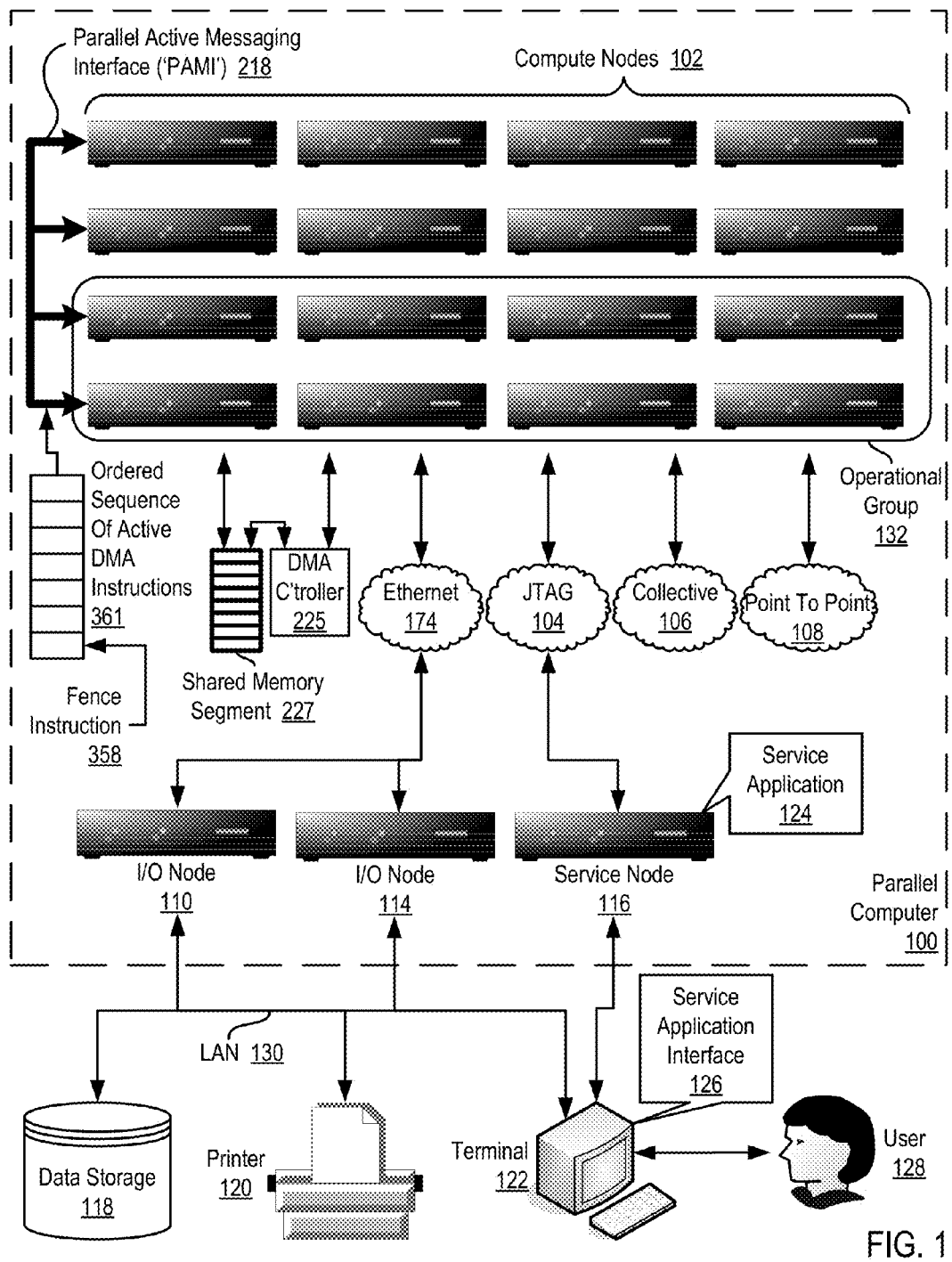
FIG. 1 sets forth a block and network diagram of an example parallel computer that fences DMA data transfers in a parallel active messaging interface ('PAMI') according to embodiments of the present invention.

Example methods, computers, and computer program products for fencing direct memory access ('DMA') data transfers in a parallel active messaging interface ('PAMI') of a parallel computer according to embodiments of the present invention are described with reference to the accompanying drawings, beginning with FIG. 1. FIG. 1 sets forth a block and network diagram of an example parallel computer (100) that fences DMA data transfers in a parallel active messaging interface ('PAMI') according to embodiments of the present invention. The parallel computer (100) in the example of FIG. 1 is coupled to non-volatile memory for the computer in the form of data storage device (118), an output device for the computer in the form of printer (120), and an input/output device for the computer in the form of computer terminal (122). The parallel computer (100) in the example of FIG. 1 includes a plurality of compute nodes (102).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art applications messaging module or parallel communications library, an application-level messaging module of computer program instructions for data communications on parallel computers. Such an application messaging module is disposed in an application messaging layer in a data communications protocol stack. Examples of prior-art parallel communications libraries that may be improved for use with parallel computers that fence data transfers in a PAMI according to embodiments of the present invention include IBM's MPI library, the 'Parallel Virtual Machine' ('PVM') library, MPICH, OpenMPI, and LAM/MPI. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the example parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As the term is used here, a parallel active messaging interface or 'PAMI' (218) is a system-level messaging layer in a protocol stack of a parallel computer that is composed of data communications endpoints each of which is specified with data communications parameters for a thread of execution on a compute node of the parallel computer. The PAMI is a 'parallel' interface in that many instances of the PAMI operate in parallel on the compute nodes of a parallel computer. The PAMI is an 'active messaging interface' in that data communications messages in the PAMI are active messages, 'active' in the sense that such messages implement callback functions to advise of message dispatch and instruction completion and so on, thereby reducing the quantity of acknowledgment traffic and the like burdening the data communication resources of the PAMI.

Each data communications endpoint of a PAMI is implemented as a combination of a client, a context, and a task. A 'client' as the term is used in PAMI operations is a collection of data communications resources dedicated to the exclusive use of an application-level data processing entity, an application or an application messaging module such as an MPI library. A 'context' as the term is used in PAMI operations is composed of a subset of a client's collection of data processing resources, context functions, and a work queue of data transfer instructions to be performed by use of the subset through the context functions operated by an assigned thread of execution. In at least some embodiments, the context's subset of a client's data processing resources is dedicated to the exclusive use of the context. A 'task' as the term is used in PAMI operations refers to a canonical entity, an integer or objection oriented programming object, that represents in a PAMI a process of execution of the parallel application. That is, a task is typically implemented as an identifier of a particular instance of an application executing on a compute node, a compute core on a compute node, or a thread of execution on a multi-threading compute core on a compute node.

In the example of FIG. 1, the compute nodes (102) and PAMI endpoints on the compute nodes are coupled for data communications through a PAMI (218) and through data communications resources that include direct memory access ('DMA') controllers (225) operatively coupled to segments (227) of shared random access memory through which the DMA controllers deliver data communications deterministically. That is, DMA controllers operate segments of shared memory so as to effect deterministic data communications among PAMI endpoints on the compute nodes. Deterministic data communications are data communications that are delivered to target endpoints in the same order in which the communications are transmitted from origin endpoints. Such a segment of shared memory can be operated deterministically by, for example, subdivision into packet-sized bins with one or more status flags or status bits indicating for each bin whether the bin has been written to by a source endpoint since it was last read and whether the bin has been read by a target endpoint since it was last written. Or even a single bit or a single-bit flag can be used to indicate 'dirty,' that is, written since read, or 'free,' that is, read since last written. In this configuration, the segment of shared memory can have data written into it by a source endpoint, which then sets a flag to indicate 'dirty,' and read from it by a target endpoint, which then resets the flag to 'free.' The writing function of the source endpoint typically is an advance function of a context of the source endpoint; the reading function of the target endpoint typically is an advance function of a context of the target endpoint.

The DMA controller working for a source endpoint, in transmitting data through such a segment of shared memory, increments an address counter and steps through the bins, writing packetized data as it goes, setting flags to 'dirty,' wrapping back to the beginning of the segment when it reaches the end. If the source DMA controller reaches a previously written bin that has not yet been read by the target endpoint, that is, a bin whose status flag still indicates 'dirty,' the source endpoint pauses writing until the bin has been read. The target DMA controller maintains an address counter and steps through the bins of the segment reading data from the bins. These data reads are memcopies, string moves, or the like, moves or copies of data from the segment of shared memory into a receive buffer of the target endpoint. If the target endpoint arrives at a bin that has been read since it was written, that is, with a status flag indicating still 'free,' the target endpoint ceases reading until more data has been written by the source endpoint. Readers in view of this explanation will recognize that such a segment of shared memory is operated in effect like a kind of virtual network with virtual packet traffic, 'virtual' in the sense that the segment of shared memory and the data packets operate very like a network with data packets although the segment of shared memory is not actually a network and the data packets are not network data packets or network frames. At any rate, a segment of shared memory so operated does function deterministically, delivering data communications to target endpoints in the same order in which the communications are transmitted from origin endpoints.

Also optionally in the example of FIG. 1, the compute nodes (102) can be coupled for data communications through the PAMI (218), through DMA controllers (225), and through a deterministic data communications network (108), in this example, the Point To Point network (108). That is, the Point To Point network, which is typically implemented as a torus or mesh, also is configured to effect deterministic data communications among PAMI endpoints on the compute nodes. As mentioned above, deterministic data communications are data communications that are delivered to target endpoints in the same order in which the communications are transmitted from origin endpoints. Such a network can be configured for deterministic operations in a number of ways. The network can be configured with routing information, tables or parameters, that specify and require communications between any two particular endpoints always to use exactly the same route through the network; in this way, any transmissions between those two endpoints will always be delivered to the target endpoint in exactly the same order in which the communications were injected into the network from the origin endpoint. Alternatively, adapters, switches, routers, and DMA controllers of the network can be configured to administer sequence numbers in packet headers or frame headers so that the network itself enforces sequencing regardless of the route through the network for any particular packet or frame. Very likely other ways of implementing deterministic networks will occur to those of skill in the art, and all such ways are well within the scope of the present invention.

The parallel computer of FIG. 1 operates generally for fencing data transfers in a PAMI by initiating execution through the PAMI (218) of an ordered sequence (361) of active DMA instructions for DMA data transfers between two endpoints, an origin endpoint and a target endpoint. DMA instructions include DMA PUT instructions and DMA GET instructions. These DMA instructions are true one-sided DMA instructions in that there is no cooperation required from a target processor, no computation on the target side to complete a PUT or GET because data is transferred directly to or from memory on the other side of the transfer. In this setting, the term 'target' is good for either PUT or GET. A PUT target receives data directly into its RAM from an origin endpoint. A GET target provides data directly from its RAM to the origin endpoint. Thus readers will recognize that the designation of an endpoint as an origin endpoint for a DMA transfer is a designation of the endpoint that initiates execution of a DMA transfer instruction; it is not a designation of the direction of the transfer: DMA PUT instructions transfer data from an origin endpoint to a target endpoint. DMA GET instructions transfer data from a target endpoint to an origin endpoint.

The origin endpoint and the target endpoint in a DMA transfer can be any two endpoints on any of the compute nodes (102), including two endpoints on the same compute node; the ordered sequence of send instructions resides in a work queue of a particular context and results in data transfers between two specific endpoints, an origin endpoint and a target endpoint. The DMA instructions are 'active' in the sense that the DMA instructions implement callback functions to advise of instruction dispatch and instruction completion, thereby reducing the quantity of acknowledgment traffic required on the network. Each such DMA instruction (361) effects a deterministic DMS data transfer, from the origin endpoint to the target endpoint, through a DMA controller (225) and a segment (227) of shared memory in which the DMA data transfers are effected according to the ordered sequence of the DMA instructions.

The parallel computer of FIG. 1 operates generally also for fencing data transfers in the PAMI (218) by executing through the PAMI, with no FENCE accounting for DMA data transfers, an active FENCE instruction (358). The FENCE instruction is an 'active' instruction in the sense that it is implemented with the aid of callback functions. The FENCE instruction is directed specifically to SEND instructions between two particular endpoints, the source endpoint and the target endpoint, and the FENCE instruction completes execution only after completion of all DMA instructions initiated prior to execution of the FENCE instruction for DMA data transfers between the two endpoints.

The arrangement of compute nodes, networks, and I/O devices making up the example parallel computer illustrated in FIG. 1 are for explanation only, not for limitation of the present invention. Parallel computers capable of fencing data transfers in a PAMI according to embodiments of the present invention may include additional nodes, networks, devices, and architectures, not shown in FIG. 1, as will occur to those of skill in the art. For ease of explanation, the parallel computer in the example of FIG. 1 is illustrated with only one segment (227) of shared memory and only one DMA controller (225); readers will recognize, however, that practical embodiments of such a parallel computer will include many DMA controllers and many segments of shared memory. The parallel computer (100) in the example of FIG. 1 includes sixteen compute nodes (102); parallel computers capable of fencing data transfers in a PAMI according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Fencing data transfers in a PAMI according to embodiments of the present invention is generally implemented on a parallel computer that includes a plurality of compute nodes. In fact, such computers may include thousands of such compute nodes. Each compute node is in turn itself a computer composed of one or more computer processors, its own computer memory, and its own input/output ('I/O') adapters. For further explanation, therefore, FIG. 2 sets forth a block diagram of an example compute node (152) useful in a parallel computer that fences DMA data transfers in a PAMI according to embodiments of the present invention. The compute node (152) of FIG. 2 includes one or more computer processors (164) as well as random access memory ('RAM') (156). Each processor (164) can support multiple hardware compute cores (165), and each such core can in turn support multiple threads of execution, hardware threads of execution as well as software threads. Each processor (164) is connected to RAM (156) through a high-speed front side bus (161), bus adapter (194), and a high-speed memory bus (154)—and through bus adapter (194) and an extension bus (168) to other components of the compute node. Stored in RAM (156) is an application program (158), a module of computer program instructions that carries out parallel, user-level data processing using parallel algorithms.

Also stored RAM (156) is an application messaging module (216), a library of computer program instructions that carry out application-level parallel communications among compute nodes, including point to point operations as well as collective operations. Although the application program can call PAMI routines directly, the application program (158) often executes point-to-point data communications operations by calling software routines in the application messaging module (216), which in turn is improved according to embodiments of the present invention to use PAMI functions to implement such communications. An application messaging module can be developed from scratch to use a PAMI according to embodiments of the present invention, using a traditional programming language such as the C programming language or C++, for example, and using traditional programming methods to write parallel communications routines that send and receive data among PAMI endpoints and compute nodes through data communications networks or shared-memory transfers. In this approach, the application messaging module (216) exposes a traditional interface, such as MPI, to the application program (158) so that the application program can gain the benefits of a PAMI with no need to recode the application. As an alternative to coding from scratch, therefore, existing prior art application messaging modules may be improved to use the PAMI, existing modules that already implement a traditional interface. Examples of prior-art application messaging modules that can be improved to FENCE with a PAMI according to embodiments of the present invention include such parallel communications libraries as the traditional 'Message Passing Interface' ('MPI') library, the 'Parallel Virtual Machine' ('PVM') library, MPICH, and the like.

Figure 2:
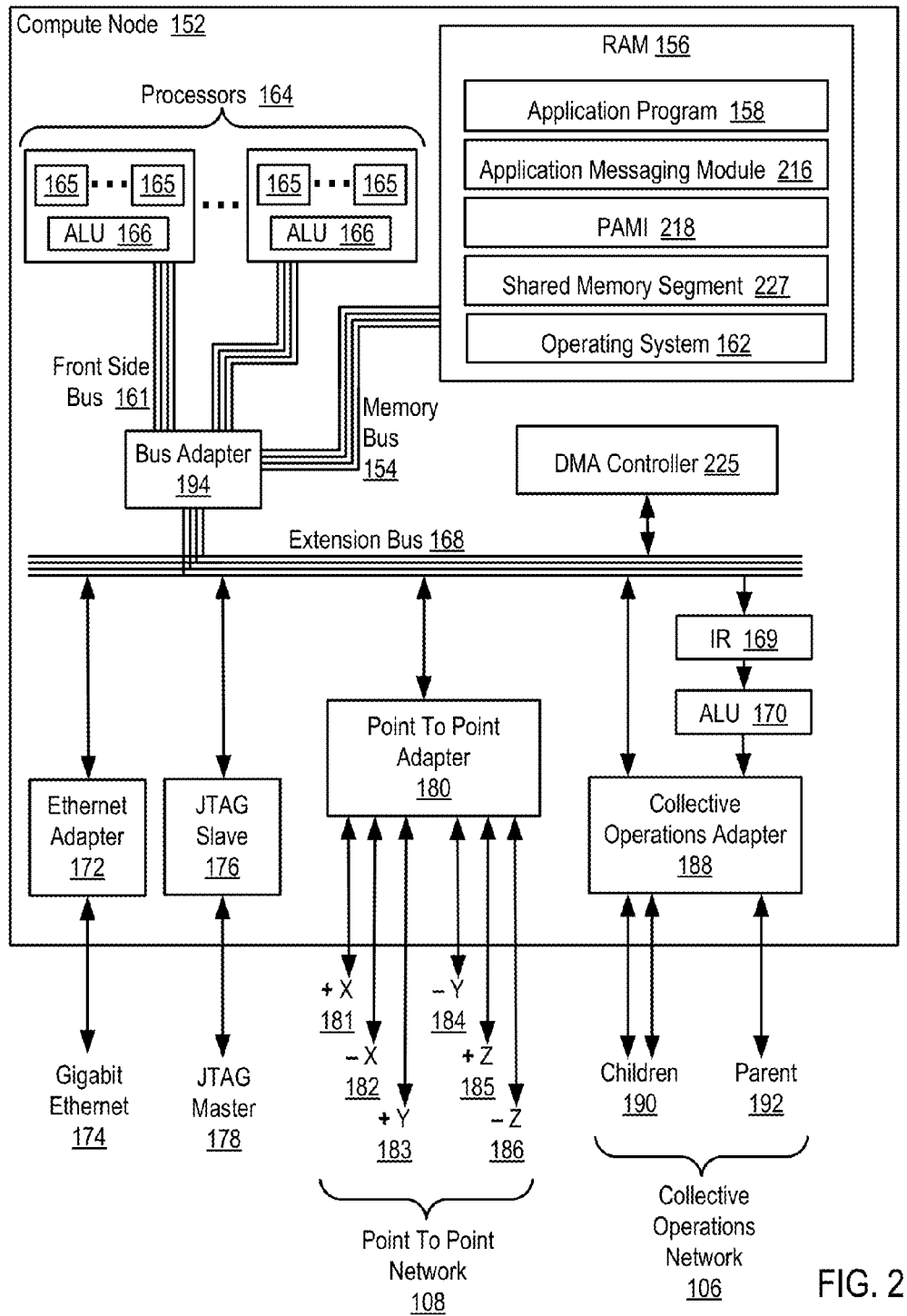
FIG. 2 sets forth a block diagram of an example compute node useful in parallel computers that fence DMA data transfers in a PAMI according to embodiments of the present invention.

Also represented in RAM in the example of FIG. 2 is a PAMI (218). Readers will recognize, however, that the representation of the PAMI in RAM is a convention for ease of explanation rather than a limitation of the present invention, because the PAMI and its components, endpoints, clients, contexts, and so on, have particular associations with hardware data communications resources. In fact, the PAMI can be implemented partly as software or firmware and hardware—or even entirely in hardware, in some embodiments at least.

Also represented in RAM (156) in the example of FIG. 2 is a segment (227) of shared memory. In typical operation, the operating system (162) in this example compute node assigns portions of address space to each processor (164), and, to the extent that the processors include multiple compute cores (165), treats each compute core as a separate processor with its own assignment of a portion of core memory or RAM (156) for a separate heap, stack, memory variable storage, and so on. The default architecture for such apportionment of memory space is that each processor or compute core operates its assigned portion of memory separately, with no ability to access memory assigned to another processor or compute core. Upon request, however, the operating system grants to one processor or compute core the ability to access a segment of memory that is assigned to another processor or compute core, and such a segment is referred to in this specification as a 'segment of shared memory.'

In the example of FIG. 2, each processor or compute core has uniform access to the RAM (156) on the compute node, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory can be configured locally for one endpoint and remotely for another endpoint—or remotely from both endpoints of a communication. From the perspective of an origin endpoint transmitting data through a segment of shared memory that is configured remotely with respect to the origin endpoint, transmitting data through the segment of shared memory will appear slower that if the segment of shared memory were configured locally with respect to the origin endpoint—or if the segment were local to both the origin endpoint and the target endpoint. This is the effect of the architecture represented by the compute node (152) in the example of FIG. 2 with all processors and all compute cores coupled through the same bus to the RAM—that all accesses to segments of memory shared among processes or processors on the compute node are local—and therefore very fast.

Also stored in RAM (156) in the example compute node of FIG. 2 is an operating system (162), a module of computer program instructions and routines for an application program's access to other resources of the compute node. It is possible, in some embodiments at least, for an application program, an application messaging module, and a PAMI in a compute node of a parallel computer to run threads of execution with no user login and no security issues because each such thread is entitled to complete access to all resources of the node. The quantity and complexity of duties to be performed by an operating system on a compute node in a parallel computer therefore can be somewhat smaller and less complex than those of an operating system on a serial computer with many threads running simultaneously with various level of authorization for access to resources. In addition, there is no video I/O on the compute node (152) of FIG. 2, another factor that decreases the demands on the operating system. The operating system may therefore be quite lightweight by comparison with operating systems of general purpose computers, a pared down or 'lightweight' version as it were, or an operating system developed specifically for operations on a particular parallel computer. Operating systems that may usefully be improved or simplified for use in a compute node according to embodiments of the present invention include UNIX™, Linux™, Microsoft XP™, AIX™, IBM's i5/OS™, and others as will occur to those of skill in the art.

The example compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in computers that fence data transfers in a parallel active messaging interface ('PAMI') according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in fencing data transfers in a PAMI according to embodiments of the present invention.

The data communications adapters in the example of FIG. 2 includes a Point To Point Adapter (180) that couples example compute node (152) for data communications to a deterministic data communications network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), -x (182), +y (183), -y (184), +z (185), and -z (186). For ease of explanation, the Point To Point Adapter (180) of FIG. 2 as illustrated is configured for data communications in three dimensions, x, y, and z, but readers will recognize that Point To Point Adapters optimized for deterministic point-to-point operations in fencing data transfers in a PAMI of a parallel computer according to embodiments of the present invention may in fact be implemented so as to support communications in two dimensions, four dimensions, five dimensions, and so on.

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

The example compute node (152) includes a number of arithmetic logic units ('ALUs'). ALUs (166) are components of processors (164), and a separate ALU (170) is dedicated to the exclusive use of collective operations adapter (188) for use in performing the arithmetic and logical functions of reduction operations. Computer program instructions of a reduction routine in an application messaging module (216) or a PAMI (218) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of an ALU (166) in a processor (164) or, typically much faster, by use of the dedicated ALU (170).

The example compute node (152) of FIG. 2 includes a direct memory access ('DMA') controller (225), a module of automated computing machinery that implements, through communications with other DMA engines on other compute nodes, or by communications to and from itself through a segment of shared memory, direct memory access to and from memory on its own compute node as well as memory on other compute nodes. Direct memory access is a way of reading and writing to and from memory of compute nodes with reduced operational burden on computer processors (164); a CPU initiates a DMA transfer, but the CPU does not execute the DMA transfer. A DMA transfer essentially copies a block of memory from one compute node to another, or between RAM segments of applications on the same compute node, from an origin to a target for a PUT operation, from a target to an origin for a GET operation.

Figure 3A:
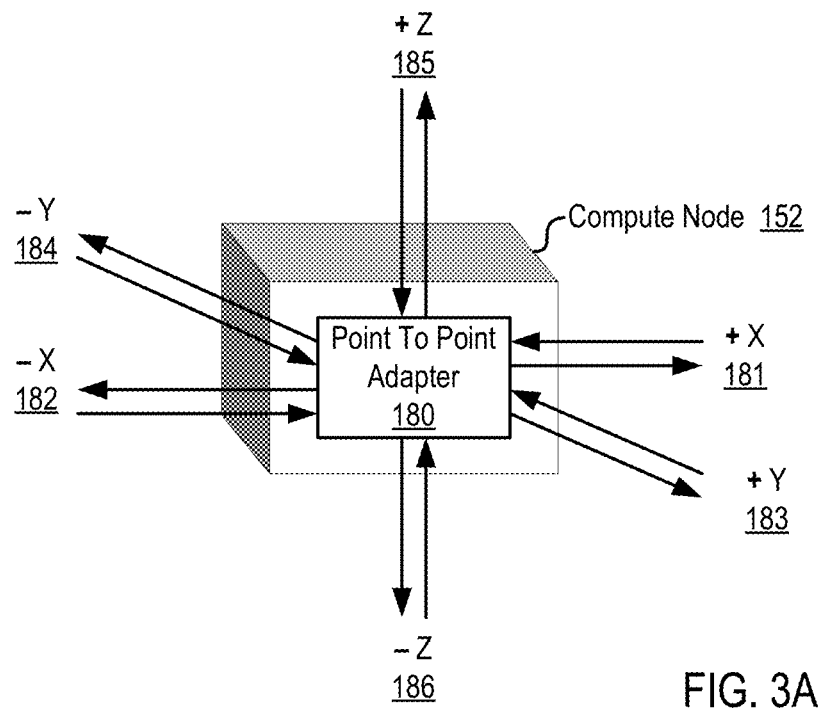
FIG. 3A illustrates an example Point To Point Adapter useful in parallel computers that DMA fence data transfers in a PAMI according to embodiments of the present invention.

For further explanation, FIG. 3A illustrates an example of a Point To Point Adapter (180) useful in parallel computers that fence DMA data transfers in a PAMI according to embodiments of the present invention. Point To Point Adapter (180) is designed for use in a deterministic data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185). For ease of explanation, the Point To Point Adapter (180) of FIG. 3A as illustrated is configured for data communications in only three dimensions, x, y, and z, but readers will recognize that Point To Point Adapters optimized for deterministic point-to-point operations in a parallel computer that fences data transfers according to embodiments of the present invention may in fact be implemented so as to support communications in two dimensions, four dimensions, five dimensions, and so on. Several supercomputers now use five dimensional mesh or torus networks, including, for example, IBM's Blue Gene Q™.

Figure 3B:
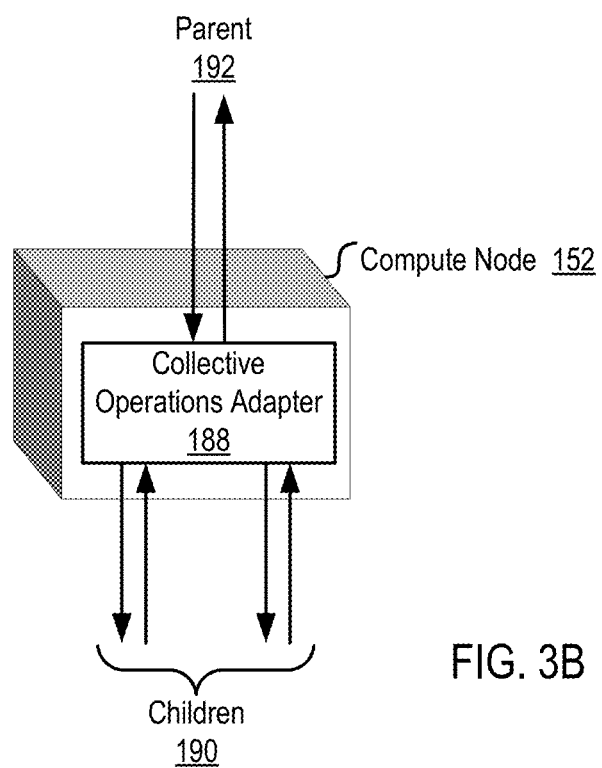
FIG. 3B illustrates an example Collective Operations Adapter useful in parallel computers that fence DMA data transfers in a PAMI according to embodiments of the present invention.

For further explanation, FIG. 3B illustrates an example of a Collective Operations Adapter (188) useful in a parallel computer that fences DMA data transfers in a PAMI according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
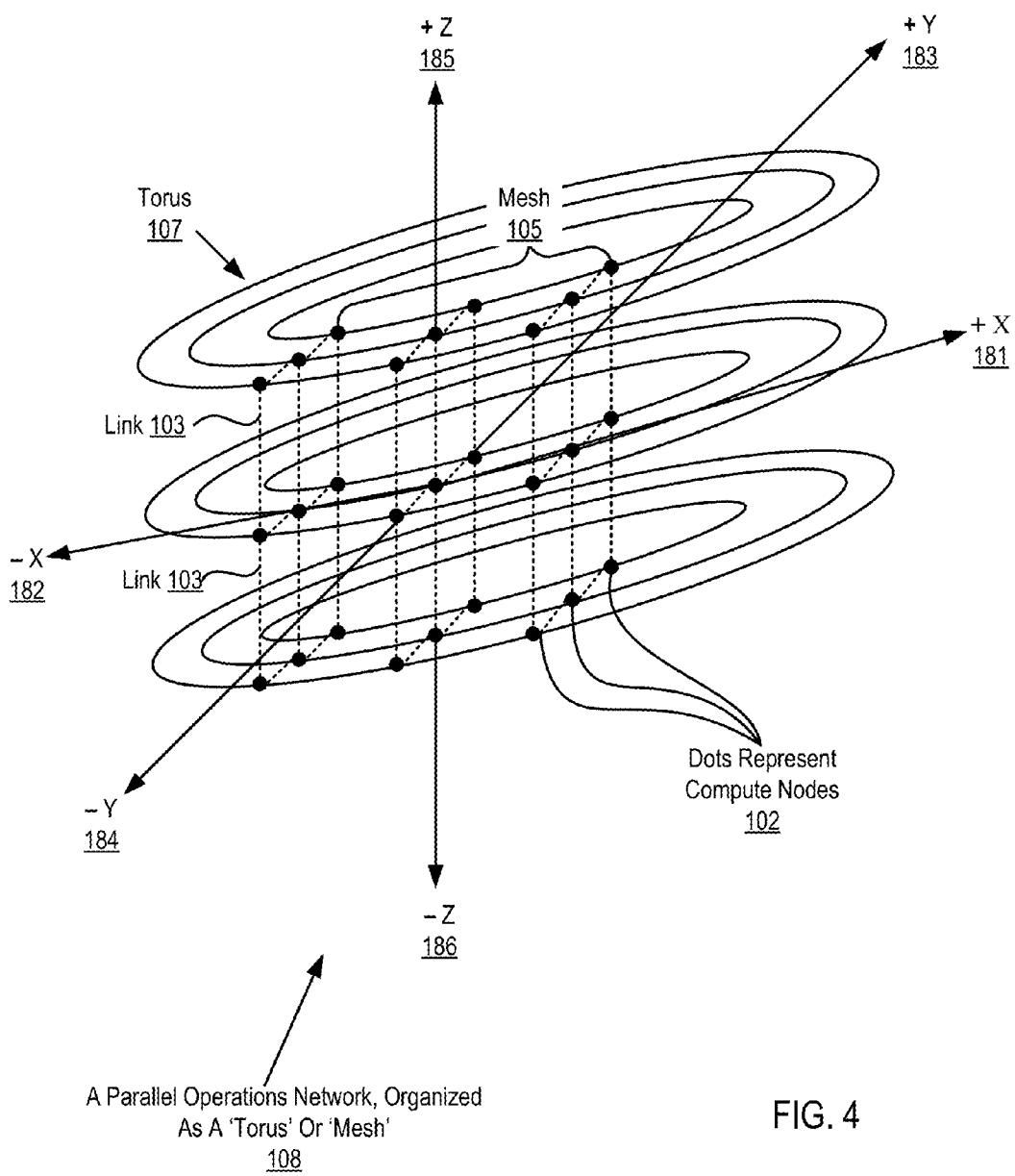
FIG. 4 illustrates an example data communications network optimized for point to point operations and useful in parallel computers that fence DMA data transfers in a PAMI according to embodiments of the present invention.

For further explanation, FIG. 4 sets forth a line drawing illustrating an example data communications network (108) optimized for point-to-point operations useful in parallel computers that fence DMA data transfers in a PAMI according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations in a parallel computer that fences data transfers according to embodiments of the present invention may contain only a few compute nodes or may contain thousands of compute nodes. For ease of explanation, the data communications network of FIG. 4 is illustrated with only three dimensions: x, y, and z, but readers will recognize that a data communications network optimized for point-to-point operations may in fact be implemented in two dimensions, four dimensions, five dimensions, and so on. As mentioned, several supercomputers now use five dimensional mesh or torus networks, including IBM's Blue Gene Q™.

Figure 5:
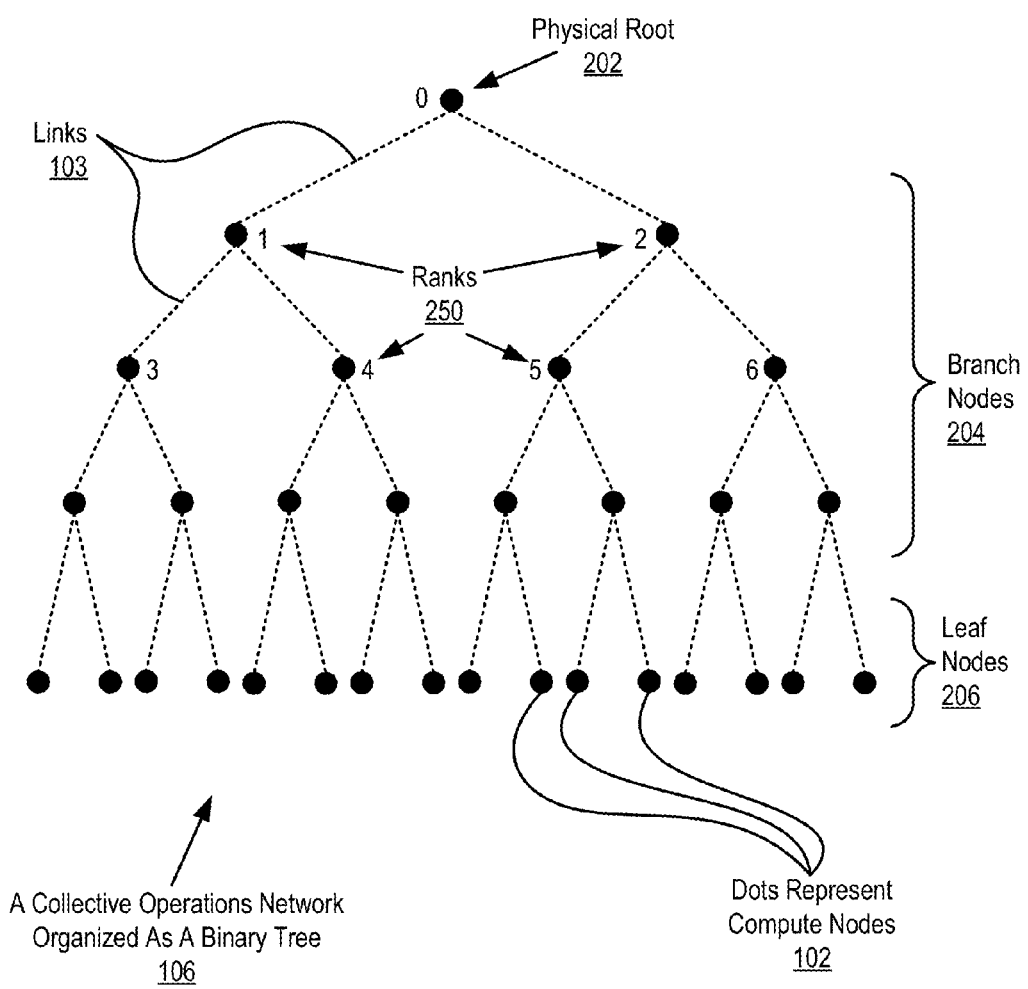
FIG. 5 illustrates an example data communications network optimized for collective operations by organizing compute nodes in a tree and useful in parallel computers that fence DMA data transfers in a PAMI according to embodiments of the present invention.

For further explanation, FIG. 5 illustrates an example data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in parallel computers that fence data transfers in a PAMI according to embodiments of the present invention may contain only a few compute nodes or hundreds or thousands of compute nodes.

In the example of FIG. 5, each node in the tree is assigned a unit identifier referred to as a 'rank' (250). The rank actually identifies an instance of a parallel application that is executing on a compute node. That is, the rank is an application-level identifier. Using the rank to identify a node assumes that only one such instance of an application is executing on each node. As mentioned, a compute node can support multiple processors, each of which can support multiple processing cores—so that more than one process or instance of an application can easily be present under execution on any given compute node—or in all the compute nodes, for that matter. To the extent that more than one instance of an application executes on a single compute node, the rank identifies the instance of the application as such rather than the compute node. A rank uniquely identifies an application's location in the tree network for use in both point-to-point and collective operations in the tree network. The ranks in this example are assigned as integers beginning with '0' assigned to the root instance or root node (202), '1' assigned to the first node in the second layer of the tree, '2' assigned to the second node in the second layer of the tree, '3' assigned to the first node in the third layer of the tree, '4' assigned to the second node in the third layer of the tree, and so on. For ease of illustration, only the ranks of the first three layers of the tree are shown here, but all compute nodes, or rather all application instances, in the tree network are assigned a unique rank. Such rank values can also be assigned as identifiers of application instances as organized in a mesh or torus network.

Figure 6:
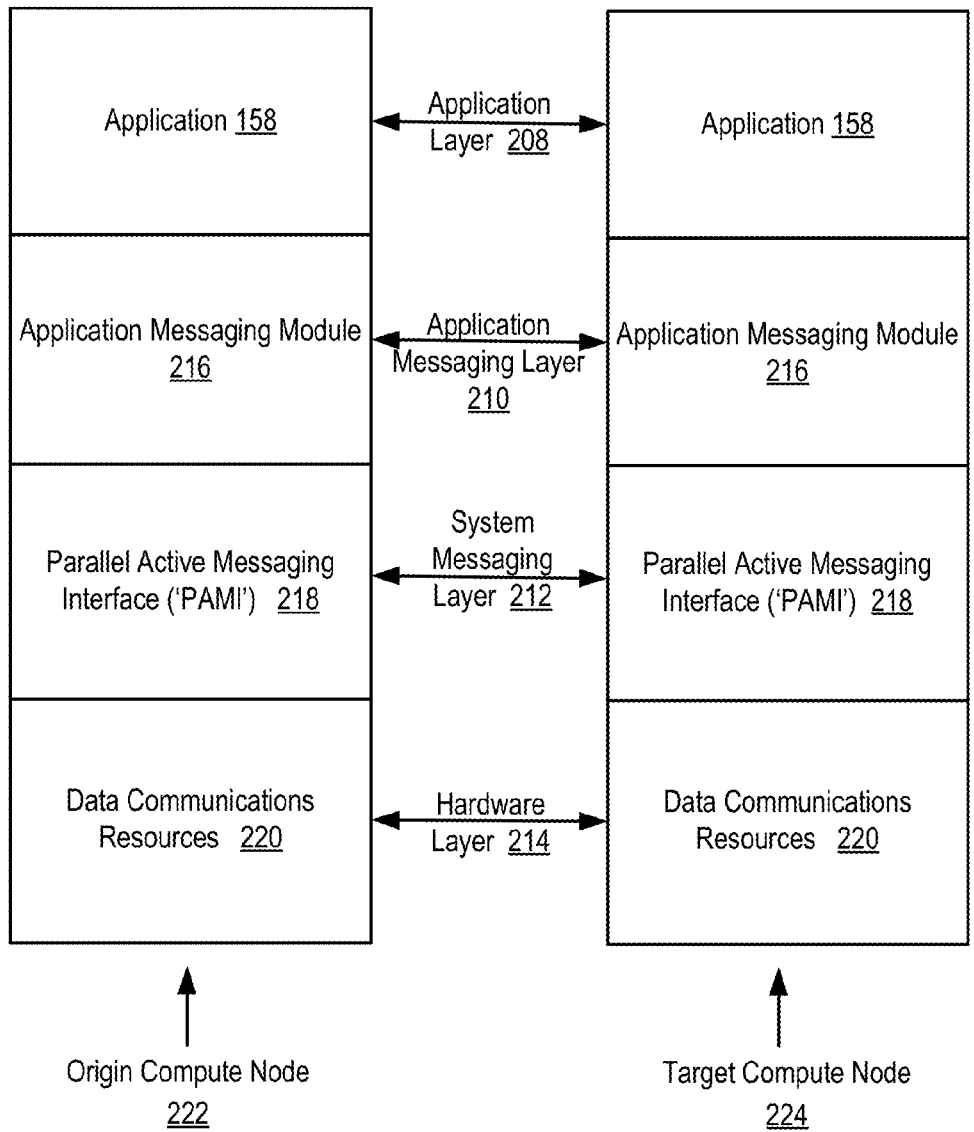
FIG. 6 sets forth a block diagram of an example protocol stack useful in parallel computers that fence DMA data transfers in a PAMI according to embodiments of the present invention.

For further explanation, FIG. 6 sets forth a block diagram of an example protocol stack useful in parallel computers that fence DMA data transfers in a PAMI according to embodiments of the present invention. The example protocol stack of FIG. 6 includes a hardware layer (214), a system messaging layer (212), an application messaging layer (210), and an application layer (208). For ease of explanation, the protocol layers in the example stack of FIG. 6 are shown connecting an origin compute node (222) and a target compute node (224), although it worthwhile to point out that in embodiments that effect deterministic DMA data transfers through a segment of shared memory, the origin compute node and the target compute node often are the same compute node—because the segment of shared memory is local memory on a single compute node shared among processes or processors on the same compute node. The granularity of connection through the system messaging layer (212), which is implemented with a PAMI (218), is finer than merely compute node to compute node—because, again, communications among endpoints through a segment of shared memory often is communications among endpoints on the same compute node. Further explanation: The PAMI (218) connects endpoints, connections specified by combinations of clients, contexts, and tasks, each such combination being specific to a thread of execution on a compute node, with each compute node capable of supporting many threads and therefore many endpoints. Every endpoint typically can function as both an origin endpoint or a target endpoint for data transfers through a PAMI, and both the origin endpoint and its target endpoint can be located on the same compute node. So an origin compute node (222) and its target compute node (224) can in fact, and often will, be the same compute node.

The application layer (208) provides communications among instances of a parallel application (158) running on the compute nodes (222, 224) by invoking functions in an application messaging module (216) installed on each compute node. Communications among instances of the application through messages passed between the instances of the application. Applications may communicate messages invoking function of an application programming interface ('API') exposed by the application messaging module (216). In this approach, the application messaging module (216) exposes a traditional interface, such as an API of an MPI library, to the application program (158) so that the application program can gain the benefits of a PAMI, reduced network traffic, callback functions, and so on, with no need to recode the application. Alternatively, if the parallel application is programmed to use PAMI functions, the application can call the PAMI functions directly, without going through the application messaging module.

The example protocol stack of FIG. 6 includes a system messaging layer (212) implemented here as a PAMI (218). The PAMI provides system-level data communications functions that support messaging in the application layer (602) and the application messaging layer (610). Such system-level functions are typically invoked through an API exposed to the application messaging modules (216) in the application messaging layer (210). Although developers can in fact access a PAMI API directly by coding an application to do so, a PAMI's system-level functions in the system messaging layer (212) in many embodiments are isolated from the application layer (208) by the application messaging layer (210), making the application layer somewhat independent of system specific details. With an application messaging module presenting a standard MPI API to an application, for example, with the application messaging module retooled to use the PAMI to carry out the low-level messaging functions, the application gains the benefits of a PAMI with no need to incur the expense of reprogramming the application to call the PAMI directly. Because, however, some applications will in fact be reprogrammed to call the PAMI directly, all entities in the protocol stack above the PAMI are viewed by PAMI as applications. When PAMI functions are invoked by entities above the PAMI in the stack, the PAMI makes no distinction whether the caller is in the application layer or the application messaging layer, no distinction whether the caller is an application as such or an MPI library function invoked by an application. As far as the PAMI is concerned, any caller of a PAMI function is an application.

The protocol stack of FIG. 6 includes a hardware layer (634) that defines the physical implementation and the electrical implementation of aspects of the hardware on the compute nodes such as the bus, network cabling, connector types, physical data rates, data transmission encoding and many other factors for communications between the compute nodes (222) on the physical network medium. In parallel computers that fence data transfers with DMA controllers and segments of shared memory according to embodiments of the present invention, the hardware layer includes DMA resources as well as shared memory transfer capabilities.

Figure 7:
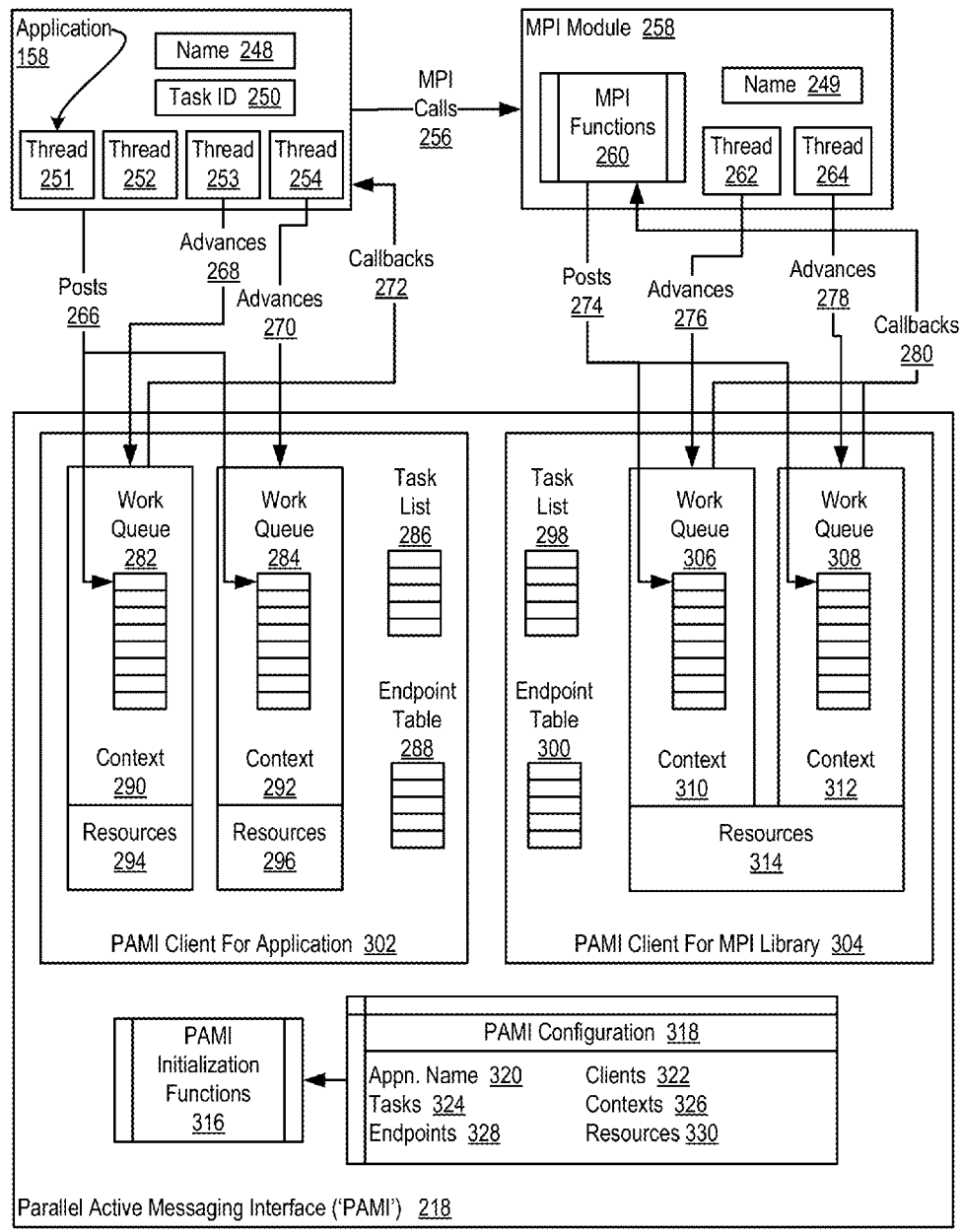
FIG. 7 sets forth a functional block diagram of an example PAMI useful in parallel computers that fence DMA data transfers in a PAMI according to embodiments of the present invention.

For further explanation, FIG. 7 sets forth a functional block diagram of an example PAMI (218) useful in parallel computers that fence DMA data transfers in a PAMI according to embodiments of the present invention. The PAMI (218) provides an active messaging layer that supports both point to point communications in a mesh or torus as well as collective operations, gathers, reductions, barriers, and the like in tree networks, for example. The PAMI is a multithreaded parallel communications engine designed to provide low level message passing functions, many of which are one-sided, and abstract such functions for higher level messaging middleware, referred to in this specification as applications messaging modules in an application messaging layer. In the example of FIG. 7, the application messaging layer is represented by a generic MPI module (258), appropriate for ease of explanation because some form of MPI is a de facto standard for such messaging middleware. Compute nodes and communications endpoints of a parallel computer (102 on FIG. 1) are coupled for data communications through such a PAMI and through data communications resources (294, 296, 314) that include DMA controllers and segments of shared random access memory through which DMA controllers deliver data communications deterministically, in the same order in which the communications are transmitted. That is, the DMA controllers operate segments of shared memory so as to effect deterministic data communications among PAMI endpoints. The PAMI (218) provides data communications among data communications endpoints, where each endpoint is specified by data communications parameters for a thread of execution on a compute node, including specifications of a client, a context, and a task.

The PAMI (218) in this example includes PAMI clients (302, 304), tasks (286, 298), contexts (190, 292, 310, 312), and endpoints (288, 300). A PAMI client is a collection of data communications resources (294, 295, 314) dedicated to the exclusive use of an application-level data processing entity, an application or an application messaging module such as an MPI library. Data communications resources assigned in collections to PAMI clients are explained in more detail with reference to FIGS. 8A and 8B. PAMI clients (203, 304 on FIG. 7) enable higher level middleware, application messaging modules, MPI libraries, and the like, to be developed independently so that each can be used concurrently by an application. Although the application messaging layer in FIG. 7 is represented for example by a single generic MPI module (258), in fact, a PAMI, operating multiple clients, can support multiple message passing libraries or application messaging modules simultaneously, a fact that is explained in more detail with reference to FIG. 9. FIG. 9 sets forth a functional block diagram of an example PAMI (218) useful in parallel computers that fence DMA data transfers in a PAMI according to embodiments of the present invention in which the example PAMI operates, on behalf of an application (158), with multiple application messaging modules (502-510) simultaneously. The application (158) can have multiple messages in transit simultaneously through each of the application messaging modules (502-510). Each context (512-520) carries out, through post and advance functions, data communications for the application on data communications resources in the exclusive possession, in each client, of that context. Each context carries out data communications operations independently and in parallel with other contexts in the same or other clients. In the example FIG. 9, each client (532-540) includes a collection of data communications resources (522-530) dedicated to the exclusive use of an application-level data processing entity, one of the application messaging modules (502-510):

IBM MPI Library (502) operates through context (512) data communications resources (522) dedicated to the use of PAMI client (532), MPICH Library (504) operates through context (514) data communications resources (524) dedicated to the use of PAMI client (534), Unified Parallel C ('UPC') Library (506) operates through context (516) data communications resources (526) dedicated to the use of PAMI client (536), Partitioned Global Access Space ('PGAS') Runtime Library (508) operates through context (518) data communications resources (528) dedicated to the use of PAMI client (538), and Aggregate Remote Memory Copy Interface ('ARMCI') Library (510) operates through context (520) data communications resources (530) dedicated to the use of PAMI client (540).

Again referring to the example of FIG. 7: The PAMI (218) includes tasks, listed in task lists (286, 298) and identified (250) to the application (158). A 'task' as the term is used in PAMI operations is a platform defined integer datatype that identifies a canonical application process, an instance of a parallel application (158). Very carefully in this specification, the term 'task' is always used to refer only to this PAMI structure, not the traditional use of the computer term 'task' to refer to a process or thread of execution. In this specification, the term 'process' refers to a canonical data processing process, a container for threads in a multithreading environment. In particular in the example of FIG. 7, the application (158) is implemented as a canonical process with multiple threads (251-254) assigned various duties by a leading thread (251) which itself executes an instance of a parallel program. Each instance of a parallel application is assigned a task; each task so assigned can be an integer value, for example, in a C environment, or a separate task object in a C++ or Java environment. The tasks are components of communications endpoints, but are not themselves communications endpoints; tasks are not addressed directly for data communications in PAMI. This gives a finer grained control than was available in prior message passing art. Each client has its own list (286, 298) of tasks for which its contexts provide services; this allows each process to potentially reside simultaneously in two or more different communications domains as will be the case in certain advanced computers using, for example, one type of processor and network in one domain and an completely different processor type and network in another domain, all in the same computer.

The PAMI (218) includes contexts (290, 292, 310, 312). A 'context' as the term is used in PAMI operations is composed of a subset of a client's collection of data processing resources, context functions, and a work queue of data transfer instructions to be performed by use of the subset through the context functions operated by an assigned thread of execution. That is, a context represents a partition of the local data communications resources assigned to a PAMI client. Every context within a client has equivalent functionality and semantics. Context functions implement contexts as threading points that applications use to optimize concurrent communications. Communications initiated by a local process, an instance of a parallel application, uses a context object to identify the specific threading point that will be used to issue a particular communication independent of communications occurring in other contexts. In the example of FIG. 7, where the application (158) and the application messaging module (258) are both implemented as canonical processes with multiple threads of execution, each has assigned or mapped particular threads (253, 254, 262, 264) to advance (268, 270, 276, 278) work on the contexts (290, 292, 310, 312), including execution of local callbacks (272, 280). In particular, the local event callback functions (272, 280) associated with any particular communication are invoked by the thread advancing the context that was used to initiate the communication operation in the first place. Like PAMI tasks, contexts are not used to directly address a communication destination or target, as they are a local resource.

Context functions, explained here with regard to references (472-482) on FIG. 9, include functions to create (472) and destroy (474) contexts, functions to lock (476) and unlock (478) access to a context, and functions to post (480) and advance (480) work in a context. For ease of explanation, the context functions (472-482) are illustrated in only one expanded context (512); readers will understand, however, that all PAMI contexts have similar context functions. The create (472) and destroy (474) functions are, in an object-oriented sense, constructors and destructors. In the example embodiments described in this specifications, post (480) and advance (482) functions on a context are critical sections, not thread safe. Applications must somehow ensure that critical sections are protected from re-entrant use. Applications can use mutual exclusion locks to protect critical sections. The lock (476) and unlock (478) functions in the example of FIG. 9 provide and operate such a mutual exclusion lock to protect the critical sections in the post (480) and advance (482) functions. If only a single thread posts or advances work on a context, then that thread need never lock that context. To the extent that progress is driven independently on a context by a single thread of execution, then no mutual exclusion locking of the context itself is required—provided that no other thread ever attempts to call a function on such a context. If more than one thread will post or advance work on a context, each such thread must secure a lock before calling a post or an advance function on that context. This is one reason why it is probably a preferred architecture, given sufficient resources, to assign one thread to operate each context. Progress can be driven with advance (482) functions concurrently among multiple contexts by using multiple threads, as desired by an application—shown in the example of FIG. 7 by threads (253, 254, 262, 264) which advance work concurrently, independently and in parallel, on contexts (290, 292, 310, 312).

Posts and advances (480, 482 on FIG. 9) are functions called on a context, either in a C-type function with a context ID as a parameter, or in object oriented practice where the calling entity possesses a reference to a context or a context object as such and the posts and advances are member methods of a context object. Again referring to FIG. 7: Application-level entities, application programs (158) and application messaging modules (258), post (266, 274) data communications instructions, including DMA instructions, PUTs and GETs, to the work queues (282, 284, 306, 308) in contexts and then call advance functions (268, 270, 276, 278) on the contexts to progress specific data processing and data communications that carry out the instructions. The data processing and data communications effected by the advance functions include specific messages, request to send ('RTS') messages, acknowledgments, callback execution, transfers of transfer data, and so on. Advance functions therefore operate generally by checking a work queue for any new instructions that need to be initiated and checking data communications resources for any incoming message traffic that needs to be administered, with callbacks and the like. Advance functions also carry out or trigger transfers of transfer data.

In at least some embodiments, a context's subset of a client's data processing resources is dedicated to the exclusive use of the context. In the example of FIG. 7, context (290) has a subset (294) of a client's (302) data processing resources dedicated to the exclusive use of the context (290), and context (292) has a subset (296) of a client's (302) data processing resources dedicated to the exclusive use of the context (292). Advance functions (268, 270) called on contexts (290, 292) therefore never need to secure a lock on a data communications resource before progressing work on a context—because each context (290, 292) has exclusive use of dedicated data communications resources. Usage of data communications resources in this example PAMI (218), however, is not thread-safe. When data communications resources are shared among contexts, mutual exclusion locks are needed. In contrast to the exclusive usage of resources by contexts (290, 292), contexts (310, 312) share access to their client's data communications resource (314) and therefore do not have data communications resources dedicated to exclusive use of a single context. Contexts (310, 312) therefore always must secure a mutual exclusion lock on a data communications resource before using the resource to send or receive administrative messages or transfer data.

For further explanation, here is an example pseudocode Hello World program for an application using a PAMI:

```
int main(int argc, char ** argv)
{
        PAMI_client_t  client;
        PAMI_context_t  context;
        PAMI_result_t  status = PAMI_ERROR;
        const char  *name = "PAMI";
        status  = PAMI_Client_initialize(name, &client);
        size_t _n = 1;
        status  = PAMI_Context_createv(client, NULL, 0,
        &context, _n);
        PAMI_configuration_t configuration;
        configuration.name = PAMI_TASK_ID;
        status = PAMI_Configuration_query(client, &configuration);
        size_t task_id = configuration.value.intval;
        configuration.name = PAMI_NUM_TASKS;
        status = PAMI_Configuration_query(client, &configuration);
        size_t num_tasks = configuration.value.intval;
        fprintf (stderr, "Hello process %d of %d\n", task_id,
        num_tasks);
        status = PAMI_Context_destroy(context);
        status = PAMI_Client_finalize(client);
        return 0;
}
```

This short program is termed 'pseudocode' because it is an explanation in the form of computer code, not a working model, not an actual program for execution. In this pseudocode example, an application initializes a client and a context for an application named "PAMI." PAMI_Client_initialize and PAMI_Context_createv are initialization functions (316) exposed to applications as part of a PAMI's API. These functions, in dependence upon the application name "PAMI," pull from a PAMI configuration (318) the information needed to establish a client and a context for the application. The application uses this segment:

```
PAMI_configuration_t configuration;
configuration.name = PAMI_TASK_ID;
status = PAMI_Configuration_query(client, &configuration);
size_t task_id = configuration.value.intval;
``` to retrieve its task ID and this segment:

```
configuration.name = PAMI_NUM_TASKS;
status = PAMI_Configuration_query(client, &configuration);
size_t num_tasks = configuration.value.intval;
``` to retrieve the number of tasks presently configured to carry out parallel communications and fencing of data transfers through the PAMI. The applications prints "Hello process task_id of num_tasks," where task_id is the task ID of the subject instance of a parallel application, and num_tasks is the number of instances of the application executing in parallel on compute nodes. Finally, the application destroys the context and terminates the client.

Figure 8A:
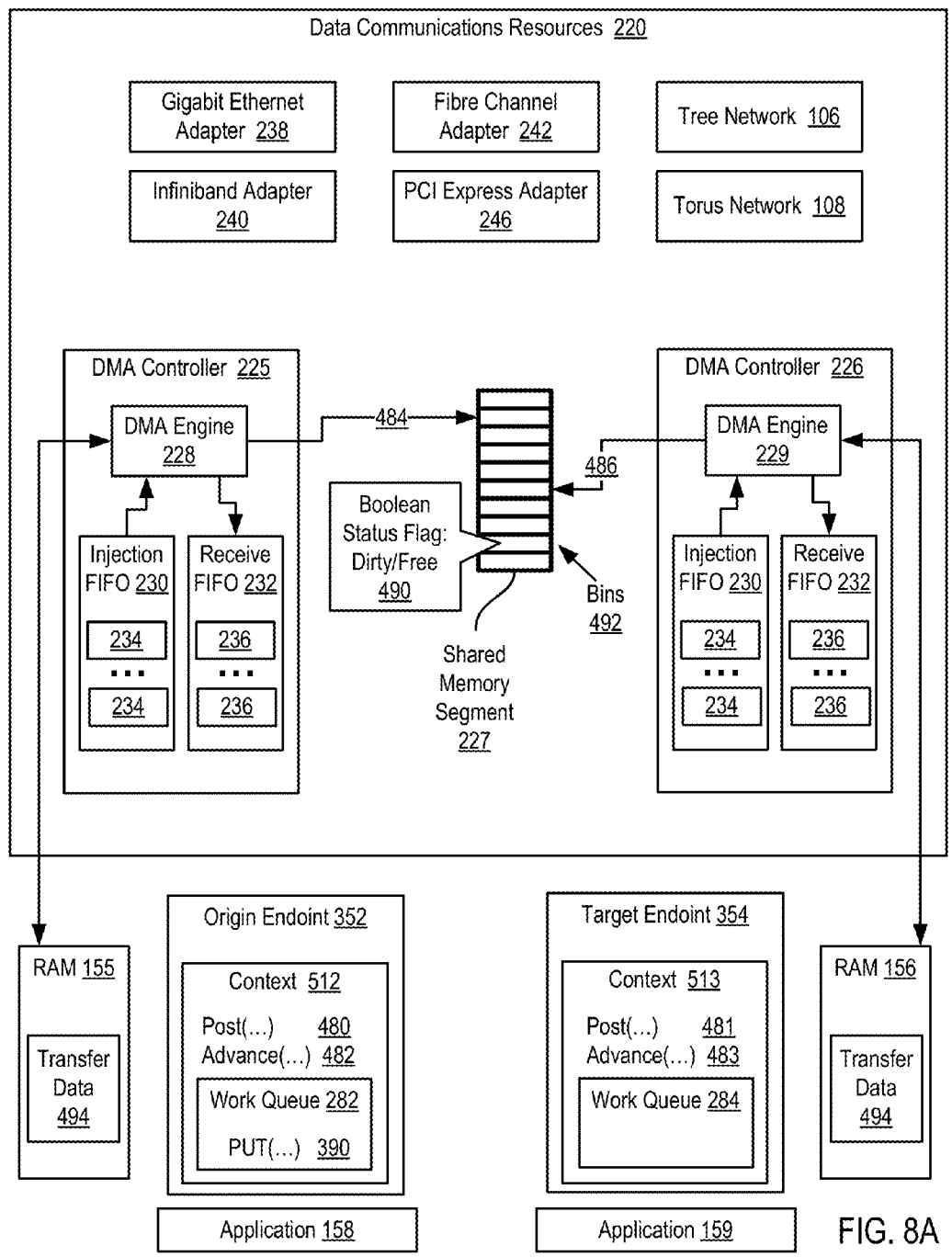
FIG. 8A sets forth a functional block diagram of example data communications resources useful in parallel computers that fence DMA data transfers in a PAMI according to embodiments of the present invention.
Figure 9:
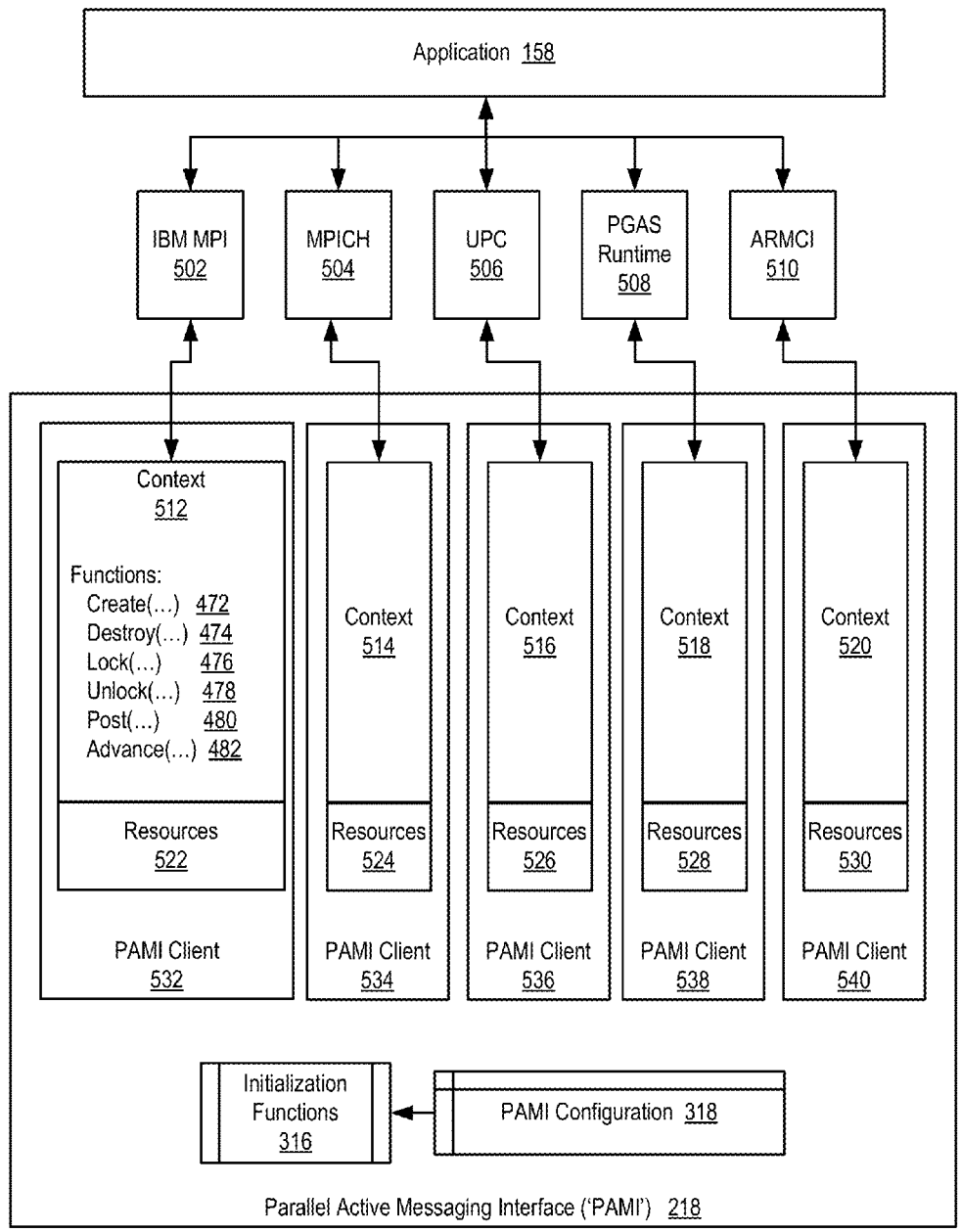
FIG. 9 sets forth a functional block diagram of an example PAMI useful in parallel computers that fence DMA data transfers in a PAMI according to embodiments of the present invention.

For further explanation of data communications resources assigned in collections to PAMI clients, FIG. 8A sets forth a block diagram of example data communications resources (220) useful in parallel computers that DMA fence data transfers in a PAMI according to embodiments of the present invention. The data communications resources of FIG. 8A include a gigabit Ethernet adapter (238), an Infiniband adapter (240), a Fibre Channel adapter (242), a PCI Express adapter (246), a collective operations network configured as a tree (106), a point to point network configured as a torus or mesh (108), DMA controllers (225, 226), and a segment (227) of shared memory. A PAMI is configured with clients, each of which is in turn configured with certain collections of such data communications resources—so that, for example, the PAMI client (302) in the PAMI (218) in the example of FIG. 7 can have dedicated to its use a collection of data communications resources composed of six segments (227) of shared memory, six Gigabit Ethernet adapters (238), and six Infiniband adapters (240). And the PAMI client (304) can have dedicated to its use six Fibre Channel adapters (242), a torus network (108), and five segments (227) of shared memory. And so on.

For further explanation of DMA controllers' deterministic operation of segments of shared memory: The DMA controllers (225, 226) each are configured with DMA control logic in the form of a DMA engine (228, 229), an injection FIFO (230), a receive FIFO (232), and memory pointers (484, 486). The DMA engines (228, 229) can be implemented as a hardware components, logic networks, of a DMA controller, in firmware, as software operating an embedded controller, as various combinations of software, firmware, or hardware, and so on. The segment (227) of shared memory in this example is divided into bins (492), subdivisions of the segment (227) of equal size, each large enough to hold a packet of transfer data and header information that includes a Boolean status flag (490). The status flag for each bin is set to TRUE to indicate 'dirty,' that a packet of transfer data has been written into a bin since the bin was read. The status flag is reset to FALSE to indicate 'free,' that transfer data in the bin has been read since the bin was last written so that the bin is now free for reuse in writing transfer data into the segment (227) of shared memory.

Each DMA engine (228, 229) operates on behalf of endpoints to send and receive DMA transfer data through the segment (227) of shared memory. In the example of a DMA PUT operation on behalf of an origin endpoint (352), the DMA engine (225) maintains a memory pointer (484) that points to a next bin into which the DMA engine (225) will write transfer data. The DMA engine (225) reads the status flag for the next bin. If the bin is free, the DMA engine (225) writes transfer data into the bin, sets the bin's status flag to 'dirty,' increments the memory pointer (484) to point to the next bin, and continues. If the bin's status flag indicates that the bin is not free, still dirty, the DMA engine (225) pauses its data transfer operation until the bin is freed by the DMA engine (229) on the receiving side of the transfer. The receiving DMA engine (229) operates on behalf of a target endpoint (354) by maintaining a memory pointer (486) that points to a next bin from which the target DMA engine (229) will read transfer data. The target DMA engine (229) reads the status flag for the next bin. If the bin is dirty, the target DMA engine (229) reads transfer data from the bin, resets the bin's status flag to 'free,' increments the memory pointer (486) to point to the next bin, and continues. If the bin's status flag indicates that the bin is not dirty, still free, the target DMA engine (229) pauses its data transfer operation until the bin is dirtied, written into, by the origin DMA engine (225). In this way, data are communicated through the segment (227) of shared memory to a target endpoint deterministically, that is, in the same order in which the data are transmitted from an origin endpoint.

The overall operation of a PUT DMA transfer with the DMA controllers (225, 226) and the segment (227) of shared memory in the example of FIG. 8A is: An originating application (158), which is typically one instance of a parallel application running on a compute node, places a quantity of transfer data (494) at a location in its RAM (155). The application (158) then calls a post function (480) on a context (512) of an origin endpoint (352), posting a PUT instruction (390) into a work queue (282) of the context (512); the PUT instruction (390) specifies a target endpoint (354) to which the transfer data is to be sent as well as source and destination memory locations. The application then calls an advance function (482) on the context (512). The advance function (482) finds the new PUT instruction in its work queue (282) and inserts a data descriptor (234) into the injection FIFO of the origin DMA controller (225); the data descriptor includes the source and destination memory locations and the specification of the target endpoint. The origin DMA engine (225) then transfers through the segment of shared memory the data descriptor (234) as well as the transfer data (494). The target DMA engine (229), upon receiving the data descriptor and the transfer data, places the transfer data (494) into the RAM (156) of the target application and inserts into the target DMA controller's receive FIFO (232) a data descriptor (236) that specifies the target endpoint and the location of the transfer data (494) in RAM (156). The target application (159) calls an advance function (483) on a context (513) of the target endpoint (354). The advance function (483) checks the communications resources assigned to its context for incoming messages, including checking the receive FIFO (232) of the target DMA controller (226) for data descriptors that specify the target endpoint (354). The advance function (483) finds the data descriptor for the PUT transfer and advises the target application (159) that its transfer data has arrived. A GET-type DMA transfer works in a similar manner, with some differences described in more detail below, including, of course, the fact that transfer data flows in the opposite direction.

Figure 8B:
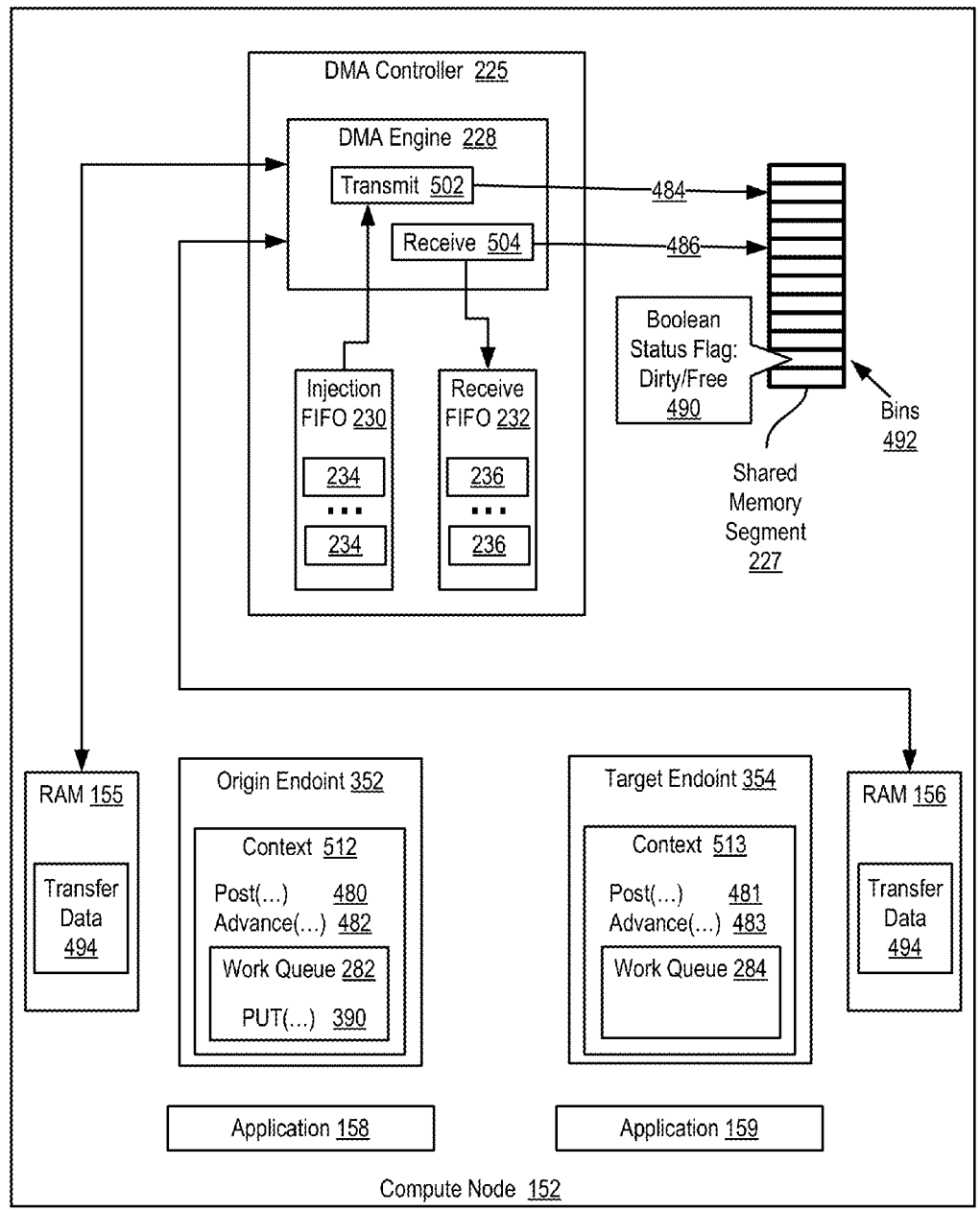
FIG. 8B sets forth a functional block diagram of an example DMA controller operatively coupled to a segment of shared memory—in an architecture where the DMA controller is the only DMA controller on a compute node—and an origin endpoint and its target endpoint are both located on the same compute node.

The example of FIG. 8A includes two DMA controllers (225, 226). DMA transfers between compute nodes can be carried out through remotely shared memory segments, requiring two DMA controllers. Compute nodes can be implemented with multiple DMA engines so that many or even all DMA transfers among endpoints on a same compute node can be carried out using two DMA engines. In some embodiments at least, however, a compute node, like the example compute node (152) of FIG. 2, has only one DMA engine, so that that DMA engine will handle both sides of transfers through segments of shared memory among endpoints on that compute node. For further explanation of this fact, FIG. 8B sets forth a functional block diagram of an example DMA controller (225) operatively coupled to a segment of shared memory—in an architecture where this DMA controller (225) is the only DMA controller on a compute node—and an origin endpoint (352) and its target endpoint (354) are both located on the same compute node (152). In the example of FIG. 8B, a single DMA engine (228) operates on behalf of endpoints (352, 354) on a same compute node to send and receive DMA transfer data through a segment (227) of shared memory. In the example of a DMA PUT operation on behalf of an origin endpoint (352), a transmit thread (502) of the DMA engine (225) maintains a memory pointer (484) that points to a next bin into which the DMA engine (225) will write transfer data. The transmit thread (502) reads the status flag for the next bin. If the bin is free, the transmit thread (502) writes transfer data into the bin, sets the bin's status flag to 'dirty,' increments the memory pointer (484) to point to the next bin, and continues. If the bin's status flag indicates that the bin is not free, still dirty, the transmit thread (502) pauses its data transfer operation until the bin is freed by a receive thread (504) of the DMA engine (229) implementing the receiving side of data transfer. The receive thread (504) operates on behalf of a target endpoint (354) by maintaining a memory pointer (486) that points to a next bin from which the DMA engine (228) will read transfer data. The receive thread (504) of the DMA engine (228) reads the status flag for the next bin. If the bin is dirty, the receive thread (504) reads transfer data from the bin, resets the bin's status flag to 'free,' increments the memory pointer (486) to point to the next bin, and continues. If the bin's status flag indicates that the bin is not dirty, still free, the receive thread (504) pauses its data transfer operation until the bin is dirtied, written into, by the transmit thread (502). In this way, data are communicated through the segment (227) of shared memory to a target endpoint deterministically, that is, in the same order in which the data are transmitted from an origin endpoint—even though the segment of shared memory is operated by only a single DMA controller (225).

The overall operation of an example PUT DMA transfer with the DMA controllers (225) and the segment (227) of shared memory in the example of FIG. 8B is: An originating application (158), that is actually one of multiple instances (158, 159) of a parallel application running on a compute node in separate threads of execution, places a quantity of transfer data (494) at a location in its RAM (155). The application (158) then calls a post function (480) on a context (512) of an origin endpoint (352), posting a PUT instruction (390) into a work queue (282) of the context (512); the PUT instruction specifies a target endpoint (354) to which the transfer data is to be sent as well as source and destination memory locations. The application (158) then calls an advance function (482) on the context (512). The advance function (482) finds the new PUT instruction (390) in its work queue (282) and inserts a data descriptor (234) into the injection FIFO of the DMA controller (225); the data descriptor includes the source and destination memory locations and the specification of the target endpoint. The DMA engine (225) then transfers by its transmit and receive threads (502, 504) through the segment (227) of shared memory the data descriptor (234) as well as the transfer data (494). The DMA engine (228), upon receiving by its receive thread (504) the data descriptor and the transfer data, places the transfer data (494) into the RAM (156) of the target application and inserts into the DMA controller's receive FIFO (232) a data descriptor (236) that specifies the target endpoint and the location of the transfer data (494) in RAM (156). The target application (159) calls an advance function (483) on a context (513) of the target endpoint (354). The advance function (483) checks the communications resources assigned to its context for incoming messages, including checking the receive FIFO (232) of the DMA controller (225) for data descriptors that specify the target endpoint (354). The advance function (483) finds the data descriptor for the PUT transfer and advises the target application (159) that its transfer data has arrived. Again, a GET-type DMA transfer works in a similar manner, with some differences described in more detail below, including, of course, the fact that transfer data flows in the opposite direction.

By use of an architecture like that illustrated and described with reference to FIG. 8B, a parallel application or an application messaging module that is already programmed to use DMA transfers can gain the benefit of the speed of data transfers among endpoints on the same compute node through a segment of local shared memory with no need to reprogram the applications or the application messaging modules to use the shared memory directly. In this way, an application or an application messaging module, already programmed for DMA, can use the same DMA calls through a same API for DMA regardless whether subject endpoints are on the same compute node sharing local memory, on separate compute nodes coupled through memory shared remotely, or on separate compute nodes coupled only through a network. The transfers will be slowest through a network, faster through memory shared remotely, and fastest through memory shared locally.

Figure 10:
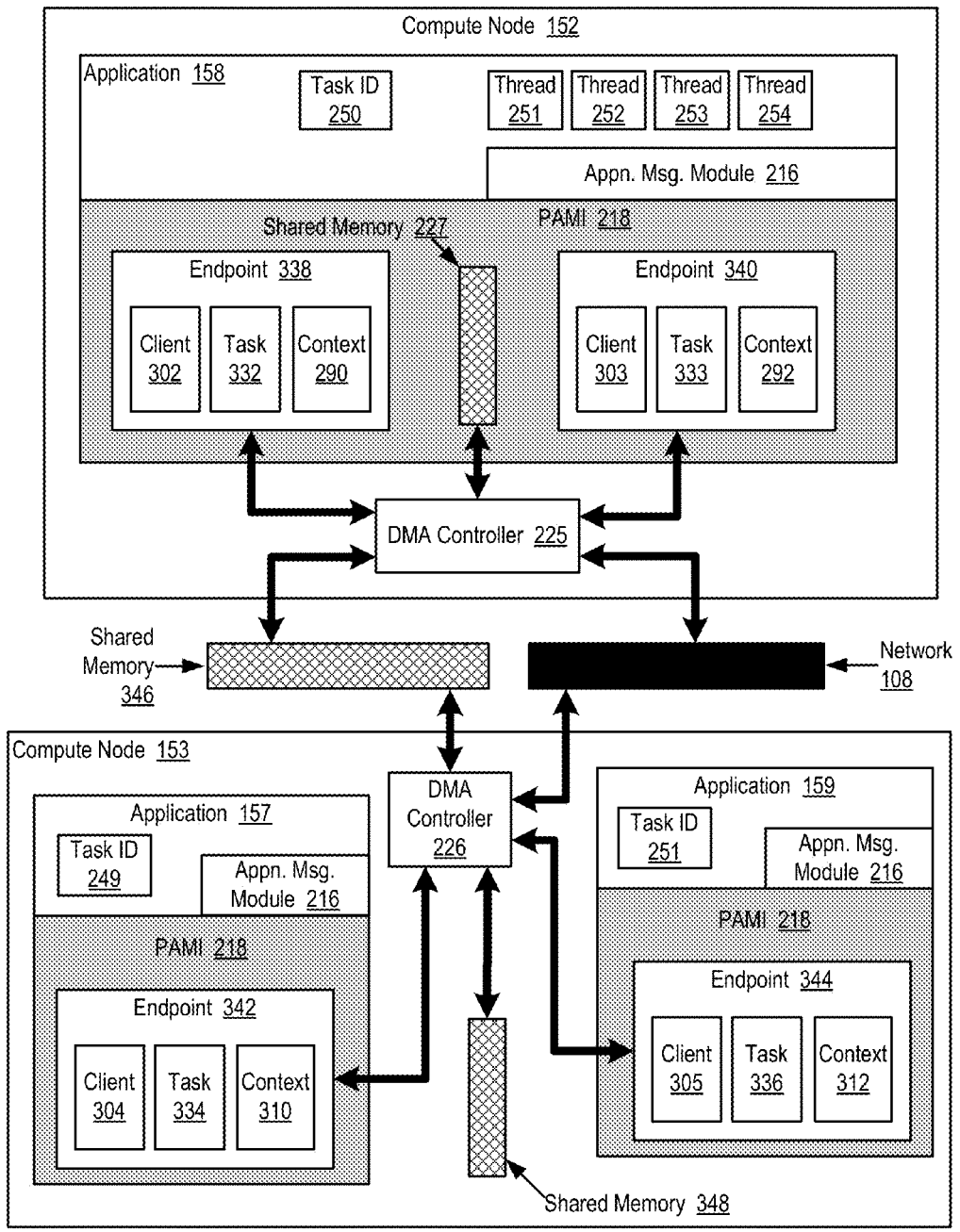
FIG. 10 sets forth a functional block diagram of example endpoints useful in parallel computers that fence DMA data transfers in a PAMI according to embodiments of the present invention.

For further explanation, FIG. 10 sets forth a functional block diagram of example endpoints useful in parallel computers that fence DMA data transfers in a PAMI according to embodiments of the present invention. In the example of FIG. 10, a PAMI (218) is implemented with instances on two separate compute nodes (152, 153) that include four endpoints (338, 340, 342, 344). Endpoints are opaque objects used to address an origin or destination in a process and are constructed from a (client, task, context) tuple. DMA instructions such as PUT and GET address a destination with an endpoint object.

Each endpoint (338, 340, 342, 344) in the example of FIG. 10 is composed of a client (302, 303, 304, 305), a task (332, 333, 334, 335), and a context (290, 292, 310, 312). A client is useful as a component in the specification of an endpoint to disambiguate the task and context identifiers, as these identifiers may be the same for multiple clients. A task is useful as a component in the specification of an endpoint to construct an endpoint to address a process accessible through a context. A context is useful as a component in the specification of an endpoint to identify the specific context associated with a the destination or target task—because the context identifies a specific threading point on a task. A context offset identifies which threading point is to process a particular communications operation. Endpoints enable "crosstalk" which is the act of issuing communication on a local context with a particular context offset that is directed to a destination endpoint with no correspondence to a source context or source context offset.

For efficient utilization of storage in an environment where multiple tasks of a client reside on the same physical compute node, an application may choose to write an endpoint table (288, 300 on FIG. 7) in a segment of shared memory (227, 346, 348). It is the responsibility of the application to allocate such segments of shared memory and coordinate the initialization and access of any data structures shared between processes. This includes any endpoint objects which are created by one process or instance of an application and read by another process.

Endpoints (342, 344) on compute node (153) serve respectively two application instances (157, 159). The tasks (334, 336) in endpoints (342, 344) are different. The task (334) in endpoint (342) is identified by the task ID (249) of application (157), and the task (336) in endpoint (344) is identified by the task ID (251) of application (159). The clients (304, 305) in endpoints (342, 344) are different, separate clients. Client (304) in endpoint (342) associates data communications resources (e.g., 294, 296, 314 on FIG. 7) dedicated exclusively to the use of application (157), while client (305) in endpoint (344) associates data communications resources dedicated exclusively to the use of application (159). Contexts (310, 312) in endpoints (342, 344) are different, separate contexts. Context (310) in endpoint (342) operates on behalf of application (157) a subset of the data communications resources of client (304), and context (312) in endpoint (344) operates on behalf of application (159) a subset of the data communications resources of client (305).

Contrasted with the PAMIs (218) on compute node (153), the PAMI (218) on compute node (152) serves only one instance of a parallel application (158) with two endpoints (338, 340). The tasks (332, 333) in endpoints (338, 340) are the same, because they both represent a same instance of a same application (158); both tasks (332,333) therefore are identified, either with a same variable value, references to a same object, or the like, by the task ID (250) of application (158). The clients (302, 303) in endpoints (338, 340) are optionally either different, separate clients or the same client. If they are different, each associates a separate collection of data communications resources. If they are the same, then each client (302, 303) in the PAMI (218) on compute node (152) associates a same set of data communications resources and is identified with a same value, object reference, or the like. Contexts (290, 292) in endpoints (338, 340) are different, separate contexts. Context (290) in endpoint (338) operates on behalf of application (158) a subset of the data communications resources of client (302) regardless whether clients (302, 303) are the same client or different clients, and context (292) in endpoint (340) operates on behalf of application (158) a subset of the data communications resources of client (303) regardless whether clients (302, 303) are the same client or different clients. Thus the tasks (332, 333) are the same; the clients (302, 303) can be the same; and the endpoints (338, 340) are distinguished at least by different contexts (290, 292), each of which operates on behalf of one of the threads (251-254) of application (158), identified typically by a context offset or a threading point.

Endpoints (338, 340) being as they are on the same compute node (152) can effect DMA data transfers between endpoints (338, 340) through DMA controller (225) and a segment of shared local memory (227). DMA transfers between endpoint (340) on compute node (152) and endpoint (344) on another compute node (153) go through DMA controllers (225, 226) and either a deterministic network (108) or a segment of shared remote memory (346). DMA transfers between endpoint (338) on compute node (152) and endpoint (342) on another compute node (153) also go through DMA controllers (225, 226) and either a deterministic network (108) or a segment of shared remote memory (346). The segment of shared remote memory (346) is a component of a Non-Uniform Memory Access ('NUMA') architecture, a segment in a memory module installed anywhere in the architecture of a parallel computer except on a local compute node. The segment of shared remote memory (346) is 'remote' in the sense that it is not installed on a local compute node. A local compute node is 'local' to the endpoints located on that particular compute node. The segment of shared remote memory (346), therefore, is 'remote' with respect to endpoints (338, 340) on compute node (158) if it is in a memory module on compute node (153) or anywhere else in the same parallel computer except on compute node (158).

Endpoints (342, 344) being as they are on the same compute node (153) can effect DMA data transfers between endpoints (342, 344) through DMA controller (226) and a segment of shared local memory (348). DMA transfers between endpoint (344) on compute node (153) and endpoint (340) on another compute node (152) go through DMA controllers (226, 225) and either a deterministic network (108) or a segment of shared remote memory (346). DMA transfers between endpoint (342) on compute node (153) and endpoint (338) on another compute node (158) go through DMA controllers (226, 225) and either a deterministic network (108) or a segment of shared remote memory (346). Again, the segment of shared remote memory (346) is 'remote' with respect to endpoints (342, 344) on compute node (153) if it is in a memory module on compute node (158) or anywhere else in the same parallel computer except on compute node (153).

Figure 11:
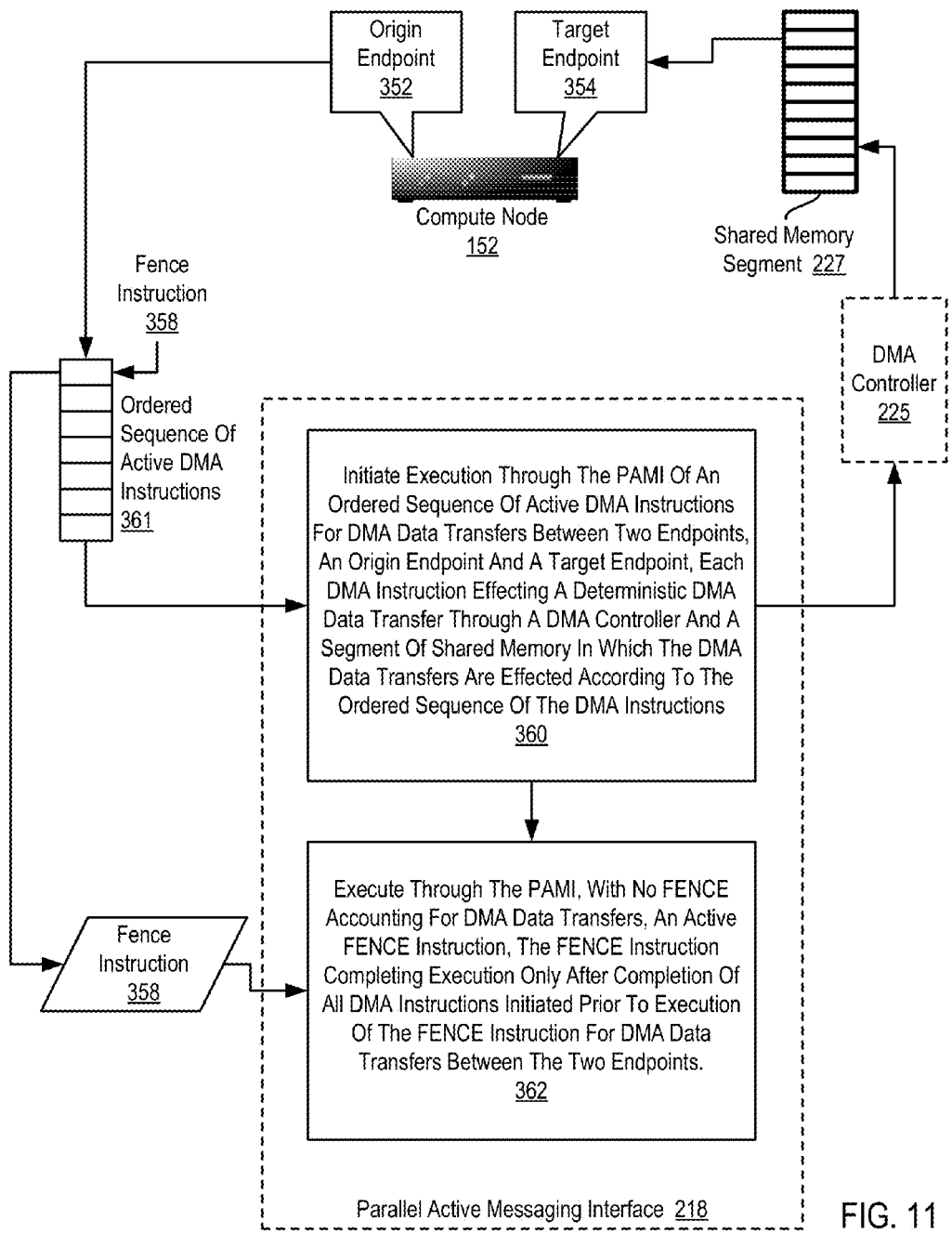
FIG. 11 sets forth a flow chart illustrating an example method of fencing DMA data transfers in a PAMI of a parallel computer according to embodiments of the present invention.

For further explanation, FIG. 11 sets forth a flow chart illustrating an example method of fencing DMA data transfers in a PAMI of a parallel computer according to embodiments of the present invention. The method of FIG. 11 is implemented in a PAMI (218) of a parallel computer composed of a number of that execute a parallel application, like those described above in this specification with reference to FIGS. 1-10. The PAMI includes data communications endpoints, with each endpoint specifying data communications parameters for a thread of execution on a compute node, including specifications of a client, a context, and a task, all as described above in this specification with reference to FIGS. 1-10. The compute nodes (152 on FIGS. 11 and 102 on FIG. 1) and endpoints on the compute nodes are coupled for data communications through the PAMI (218) and through data communications resources including DMA controllers (225) segments (227) of shared random access memory through which the DMA controllers deliver data communications deterministically, in the same order in which the communications are transmitted.

The method of FIG. 11 includes initiating (360) execution through the PAMI (218) of an ordered sequence (361) of active DMA instructions for DMA data transfers between two endpoints, an origin endpoint (352) and a target endpoint (354). Each DMA instruction effects a deterministic DMA data transfer through a DMA controller (225) and a segment (227) of shared memory in which DMA data transfers are effected according to the ordered sequence of the DMA instructions.

In this example, the origin endpoint (352) and the target endpoint are located on the same compute node (152), which is the case when the segment (227) of shared memory is a segment of local shared memory uniformly accessible to both endpoints (352, 354) on the same compute node. When the segment (227) of shared memory is a segment of remote memory non-uniformly accessible across compute nodes, then the endpoints (352, 354) can be located on separate compute nodes. An application or application messaging module initiates execution of the ordered sequence of active DMA instructions (361) by posting (266 or 274 on FIG. 7) the DMA instructions to a work queue (282, 284, 306, or 308 on FIG. 7) of a context (290, 292, 310, or 312 on FIG. 7). This sequence of DMA instructions (361) effects data transfers between two particular endpoints (352, 354), with the entire sequence of DMA instructions (361) posted to a same work queue in a same context, a PAMI context of the source endpoint (352).

The method of FIG. 11 also includes executing (362) through the PAMI (218), with no FENCE accounting for DMA data transfers, an active FENCE instruction (358). The FENCE instruction is an 'active' instruction in that it is implemented with callback functions. The FENCE instruction (358) is directed particularly to DMA instructions between the two endpoints (352, 354), and the FENCE instruction (358) completes execution only after completion of all DMA instructions initiated prior to execution of the FENCE instruction for DMA data transfers between the two endpoints. That is, the FENCE instruction executes deterministically with respect to all previously initiated DMA instructions (361). There are a number of ways in which such deterministic execution can be implemented. An application can post the FENCE instruction to a work queue of a context whose advance functions execute instructions in the work queue strictly in the order in which instructions are posted into the queue—so that execution of the FENCE instruction will not complete until after all previously posted SEND instructions have completed. To the extent that the FENCE instruction requires administrative communications with a target endpoint, request to send, advice messages, callbacks, and the like, advance functions of contexts of the endpoints (352, 354) deterministically operate communications between the endpoints through the segment (227) of shared memory, allowing the FENCE-related communications to complete only after completion of all supporting communications and data transfers of all previously initiated DMA instructions.

Figure 12:
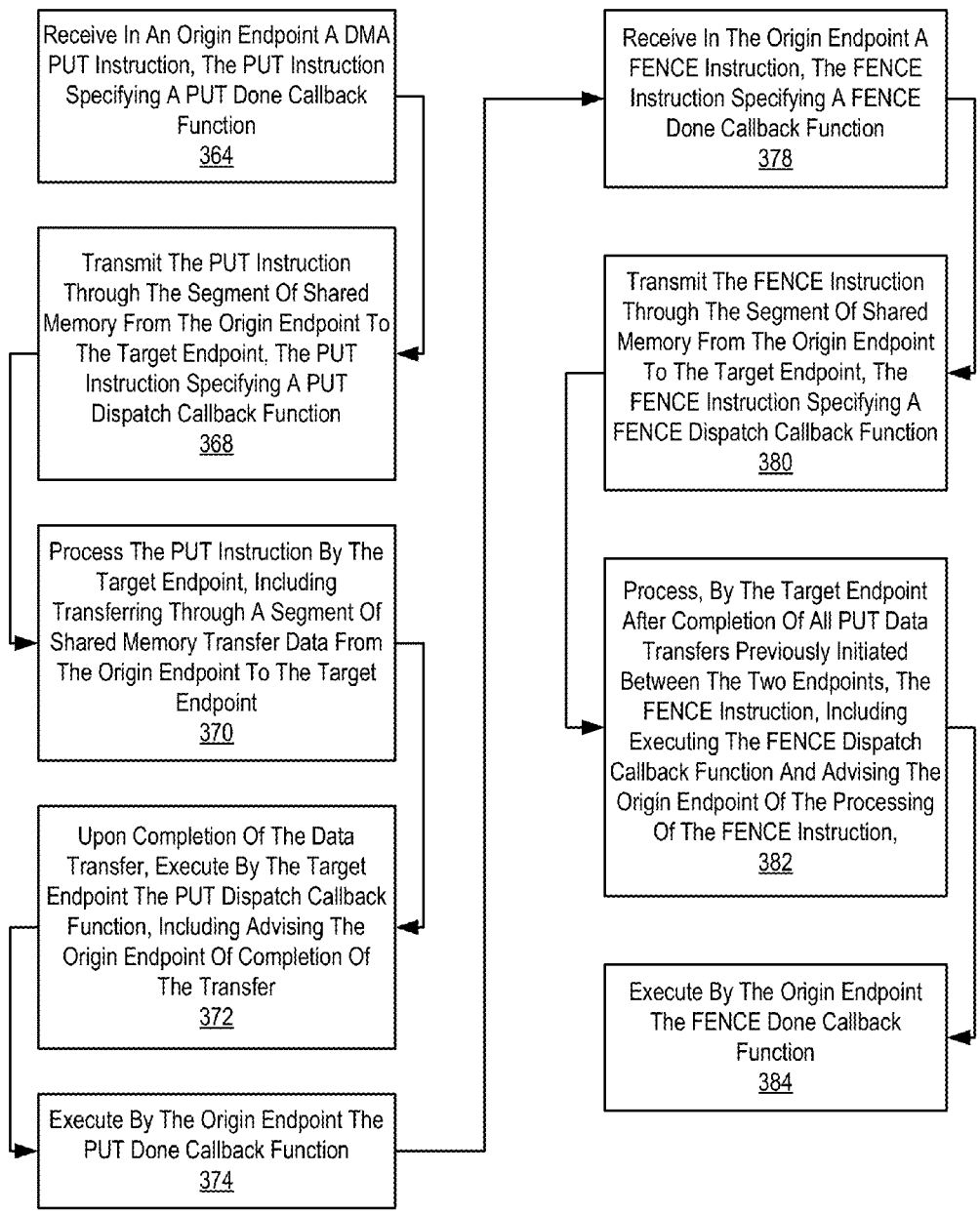
FIG. 12 sets forth a flow chart illustrating an example method of fencing DMA PUT data transfers in a PAMI of a parallel computer according to embodiments of the present invention.
Figure 13:
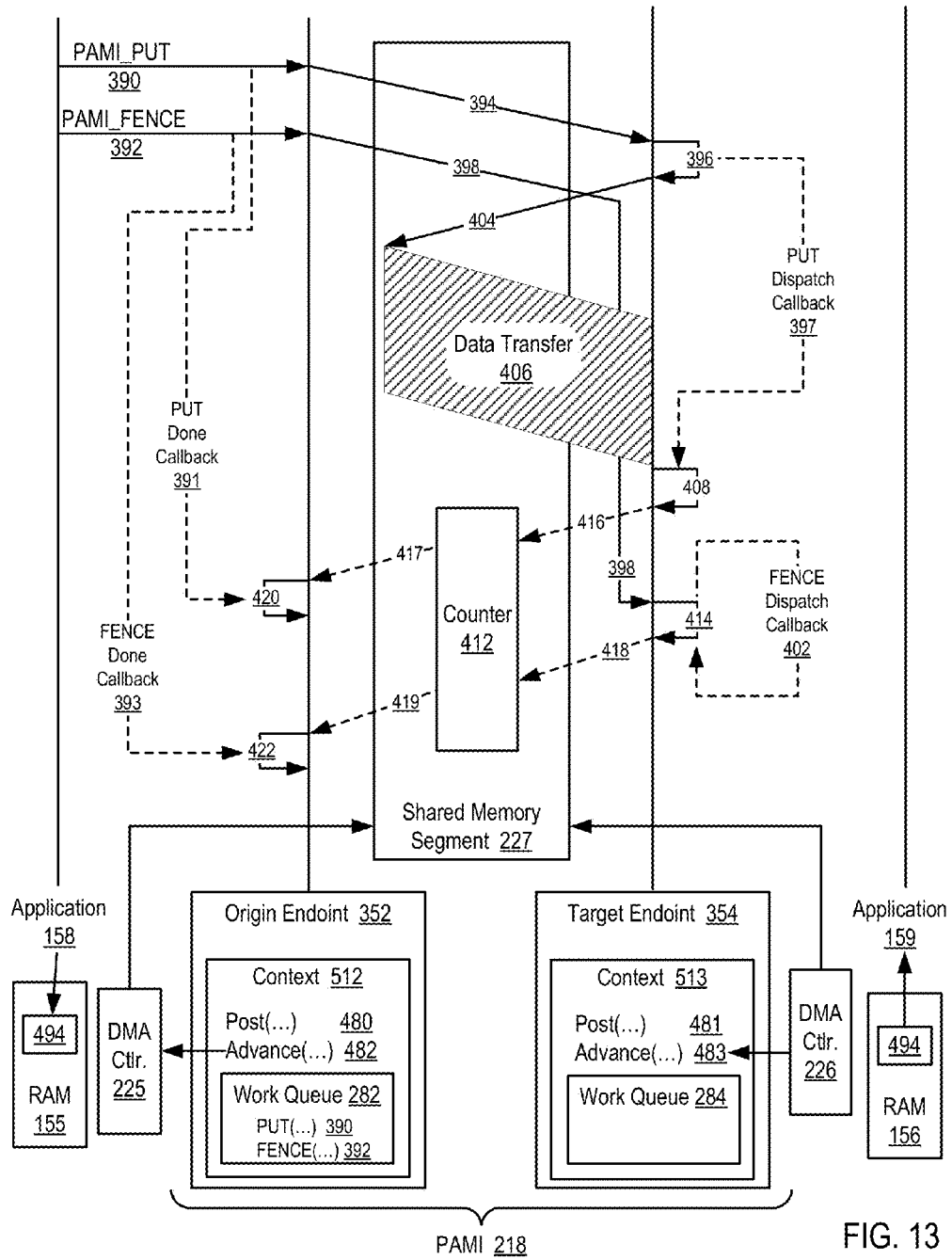
FIG. 13 sets forth a calling sequence diagram further illustrating the operations of the method of FIG. 12, an example method of fencing DMA PUT data transfers in a PAMI of a parallel computer according to embodiments of the present invention.

For further explanation, FIG. 12 sets forth a flow chart illustrating an example method of fencing DMA PUT data transfers in a PAMI of a parallel computer according to embodiments of the present invention. FIG. 13 sets forth a calling sequence diagram further illustrating the operations of the method of FIG. 12, an example of fencing DMA PUT data transfers in a PAMI of a parallel computer according to embodiments of the present invention. The method of FIG. 12 is described below in this specification, therefore, with reference both to FIG. 12 and also to FIG. 13, using reference numbers from both FIGS. 12 and 13.

The method of FIG. 12 is implemented in a PAMI (218) of a parallel computer composed of a number of compute nodes (102 on FIG. 1) that execute a parallel application (158, 159), like those described above in this specification with reference to FIGS. 1-10. The PAMI (218) includes data communications endpoints (352, 354), with each endpoint specifying data communications parameters for a thread of execution on a compute node, including specifications of a client, a context, and a task, all as described above in this specification with reference to FIGS. 1-10. The endpoints (352, 354) are coupled for data communications through the PAMI (218) and through data communications resources including DMA controllers (225, 226) and a segment (227) of shared random access memory through which data communications are delivered to target endpoints deterministically, that is, in the same order in which the communications are transmitted from origin endpoints. The endpoints (352, 354) can be located on the same compute node where a segment of memory is shared locally, although readers will recognize that a source endpoint and a target endpoint in a data processing environment that includes a Non-Uniform Memory Access ('NUMA') architecture can be located on different compute nodes.

The method of FIG. 12 includes receiving (364) in an origin endpoint (352) of a PAMI (218) a DMA PUT instruction (390). An originating application (158), which is typically one instance of a parallel application running on a compute node, places a quantity of transfer data (494) at a location in its RAM (155). The PUT instruction (390) then is received in the origin endpoint (352) through operation of a post function (480) called by the originating application (158) on a context (512) of the origin endpoint (352), posting the PUT instruction (390) to a work queue (282) of the context (512). The PUT instruction (390) specifies a data transfer to a target endpoint (354) as well as source and destination memory locations, and the PUT instruction also specifies a PUT done callback function (391) for the PUT instruction which is registered in the PAMI (218) for later use. The PUT done callback function (391) is an application-level instruction called by an advance function of the PAMI when execution of the PUT instruction is fully complete. The PUT done callback (391) can carry out any actions desired by the application at that point, but readers will recognize that one purpose of the done callback is to advise the calling application of completion of the data transfer pursuant to the PUT instruction. The application's post of the PUT instruction is non-blocking, so that the application continues other work while the PAMI executes the PUT instruction. Not blocking to wait for the PUT instruction to complete, it is common for the application to want a callback to advise of completion of the data transfer effected by the PUT.

The method of FIG. 12 also includes transmitting (368, 394) the DMA PUT instruction (390) through the segment (227) of shared memory from the origin endpoint (352) to the target endpoint (354). The PUT instruction as transmitted to the target endpoint specifies a PUT dispatch callback function (397), which is registered in the PAMI for later use. The DMA PUT instruction is transmitted by action of an advance function (482) called by an application (158) on a context (512) of the origin endpoint (352). The advance function (482) finds the PUT instruction (390) in its work queue (282) and advises a DMA controller (225), with a data descriptor, of the destination of the PUT instruction as well as the location and size of the PUT instruction, after which the DMA controller (225) transfers the PUT instruction through the segment of shared memory and the DMA controller on the target side of the transfer to the target endpoint. On the target side of the transfer of the PUT instruction, an advance function (483) of the target endpoint (354) finds in its DMA controller (226) a data descriptor specifying the location of the PUT instruction in RAM (156) on the target side and processes the PUT instruction. The advance function (482) also provides a data descriptor with the location and size of the transfer data (494) that is the subject of the PUT instruction, and the DMA controller (225) places the transfer data (494) into the segment (227) of shared memory where it is available to complete its transfer to the target endpoint.

The method of FIG. 12 also includes processing (370, 396) the PUT instruction (390) by the target endpoint, including registering the PUT dispatch callback function (397) in the PAMI and transferring (404, 406) through the segment (227) of shared memory the transfer data (494) from the origin endpoint to the target endpoint. On the target side of the transfer, an advance function (483) of the target endpoint (354) finds in its DMA controller (226) a data descriptor specifying the location of the PUT instruction in RAM (156) on the target side and processes the PUT instruction by providing to its DMA controller (226) a receive data descriptor advising the DMA controller of the size and destination memory address of the data transfer that is the subject of the PUT instruction. The DMA controller reads the transfer data (406) from the segment of shared memory and places the data as transferred (494) in target RAM (156) at the location specified in its data descriptor (e.g., 236 on FIG. 8A).

The method of FIG. 12 also includes, upon completion of the data transfer, executing (372, 408) by the target endpoint (354) the PUT dispatch callback function (397), including advising (416, 412, 417) the origin endpoint (352) of completion of the data transfer (406). The advance function (482) on the origin endpoint (352) assigns sequence numbers to data transfer messages, and the advance function (483) on the target endpoint (354) increments (416) a counter (412) in shared memory to indicate the sequence number of the last data transfer message processed by the advance function (483) of the target endpoint. Thus the advance function (482) in the origin endpoint (352), which reads (417) the counter value as part of its processing, is continually advised of the completion of the data transfers. The method of FIG. 12 also includes executing (374, 420) by the origin endpoint (352) the PUT done callback function (391). The advance function (482) matches the counter value with the sequence number of the PUT instruction, signifying the completion of the data transfer effected according to the PUT instruction, and executes (420) the previously registered PUT done callback (391).

The method of FIG. 12 also includes receiving (378) in the origin endpoint (352) a FENCE instruction (392) directed particularly to PUT operations between the origin endpoint (352) and the target endpoint (354). The FENCE instruction (390) is received in the origin endpoint (352) through operation of a post function (480) called by an application (158) on a context (512) of the origin endpoint (352), posting the FENCE instruction (392) to a work queue of the context (512). The FENCE instruction specifies a FENCE done callback function (393) which is registered in the PAMI for later use. The FENCE done callback function (393) is an application-level instruction called by an advance function of a PAMI when execution of the FENCE instruction is fully complete. The FENCE done callback (393) can carry out any actions desired by the application at that point, but readers will recognize that one purpose of the done callback is to advise the calling application of completion of the FENCE. The application's post of the FENCE instruction is non-blocking, so that the application continues other work while the PAMI executes the FENCE instruction. Not blocking to wait for the FENCE instruction to complete, it is common for the application to want a callback to advise of completion of the FENCE and therefore of all the data transfer effected by previous PUT instructions.

It is typical of a calling application (158), after posting the FENCE instruction (382), to cease further messaging operations between the two endpoints (352, 354) that are the subject of the FENCE until completion of all PUT data transfers previously initiated between the two endpoints, which is signified by completion of the FENCE, which itself is signified by the execution of the FENCE done callback (393) advising the calling application that the FENCE has completed. It is not a function of the FENCE instruction itself to block messaging operations between the endpoints until completion of the FENCE; the application must provide this function, and messaging, in this example at least, is permitted to continue between other endpoints on behalf of the same application. On the other hand, most applications behave this way because it is in the application's interest to know by the FENCE when all subject PUT transfers between those two particular endpoints has completed; that is the purpose of the FENCE in the first place.

The method of FIG. 12 also includes transmitting (380) the FENCE instruction (398) through the segment (227) of shared memory from the origin endpoint (352) to the target endpoint (354), with the FENCE instruction specifying a dispatch callback function (402). The FENCE instruction is transmitted by action of an advance function (482) called by an application (158) on a context (512) of the origin endpoint (352). The advance function (482) finds the FENCE instruction (392) in its work queue (282) and advises a DMA controller (225), with a data descriptor (e.g., 234 on FIG. 8A), of the destination of the FENCE instruction as well as the location and size of the FENCE instruction, after which the DMA controller (225) transfers the FENCE instruction through the segment of shared memory and the DMA controller (226) on the target side of the transfer to the target endpoint. On the target side of the transfer of the FENCE instruction, an advance function (483) of the target endpoint (354) finds in its DMA controller (226) a data descriptor specifying the location of the FENCE instruction in RAM (156) on the target side and processes the FENCE instruction.

The method of FIG. 12 also includes processing (382, 414) by the target endpoint (354) after completion of all PUT data transfers previously initiated between the two endpoints, the FENCE instruction (392). Processing (414) the FENCE instruction includes executing the FENCE dispatch callback function (402) and advising (418, 412, 419) the origin endpoint (352) of the processing of the FENCE instruction. On the target side of the transfer, an advance function (483) of the target endpoint (354) finds in its DMA controller (226) a data descriptor specifying the location of the FENCE instruction in RAM (156) on the target side. As mentioned, the FENCE instruction specifies a FENCE dispatch callback function. It is appropriated that this callback is labeled a dispatch callback because, in overall deterministic processing, this is the first time that the FENCE instruction is taken up for processing on the target side of the transfer. In deterministic execution, the FENCE's dispatch callback (402) with its advice of FENCE completion is not taken up for processing and execution until after all previously initiated PUTs and their data transfers are fully processed. The advance function (483) retrieves the FENCE instruction and executes its dispatch callback, which in turn advises the origin endpoint of the processing of the FENCE instruction. The advance function (482) on the origin endpoint (352) assigned a sequence number to the FENCE instruction, and the advance function (483) on the target endpoint (354) increments (418) the counter (412) in shared memory to indicate the sequence number of the FENCE instruction as the last message processed by the advance function (483) of the target endpoint. Thus the advance function (482) in the origin endpoint (352), which reads (419) the counter (412) as part of its processing, is advised of the completion of the processing of the FENCE instruction.

The method of FIG. 12 also includes executing (384, 422) by the origin endpoint (352) the FENCE done callback function (391), which was registered in the PAMI (218) earlier when execution of the FENCE (392) first began. That is, the advance function (482) called by an application (158) or an application messaging module on a context (512) of the origin endpoint (352), routinely monitors its assigned data communications resources, including reading (419) the counter (412) for the sequence number of the last processed message. The advance function (482) matches the counter value as read (419) with the sequence number of the FENCE instruction (392, 398), signifying full completion of the FENCE instruction, and calls the appropriate FENCE done callback (393) previously registered with the PAMI (218).

Figure 14:
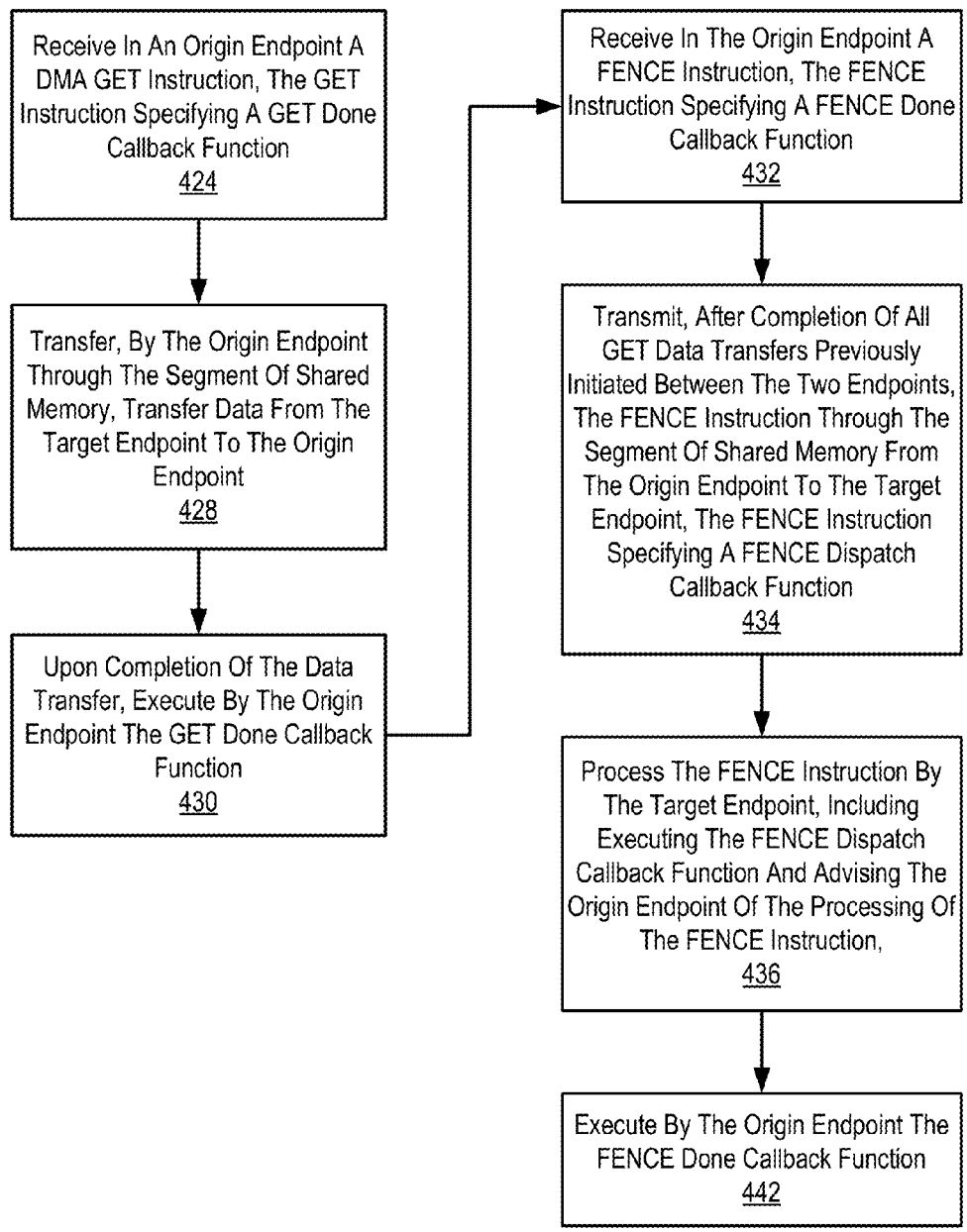
FIG. 14 sets forth a flow chart illustrating an example method of fencing DMA GET data transfers in a PAMI of a parallel computer according to embodiments of the present invention.
Figure 15:
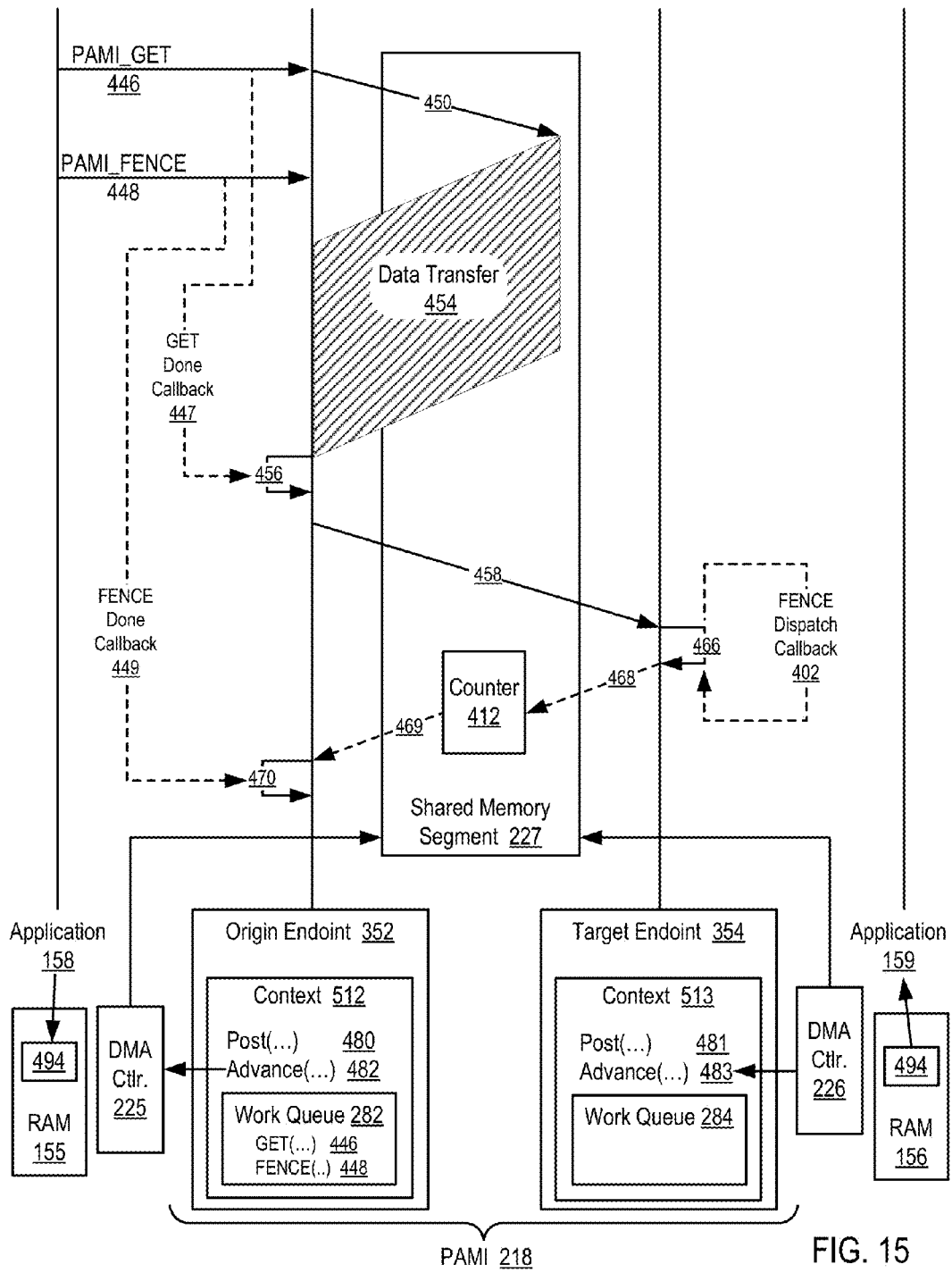
FIG. 15 sets forth a calling sequence diagram further illustrating the operations of the method of FIG. 14, an example method of fencing DMA GET data transfers in a PAMI of a parallel computer according to embodiments of the present invention.

For further explanation, FIG. 14 sets forth a flow chart illustrating an example method of fencing DMA GET data transfers in a PAMI of a parallel computer according to embodiments of the present invention. FIG. 14 sets forth a calling sequence diagram further illustrating the operations of the method of FIG. 14, an example of fencing DMA PUT data transfers in a PAMI of a parallel computer according to embodiments of the present invention. The method of FIG. 14 is described below in this specification, therefore, with reference both to FIG. 14 and also to FIG. 15, using reference numbers from both FIGS. 14 and 15.

The method of FIG. 14 is implemented in a PAMI (218) of a parallel computer composed of a number of compute nodes (102 on FIG. 1) that execute a parallel application (158, 159), like those described above in this specification with reference to FIGS. 1-10. The PAMI (218) includes data communications endpoints (352, 354), with each endpoint specifying data communications parameters for a thread of execution on a compute node, including specifications of a client, a context, and a task, all as described above in this specification with reference to FIGS. 1-10. The endpoints (352, 354) are coupled for data communications through the PAMI (218) and through data communications resources including DMA controllers (225, 226) and a segment (227) of shared random access memory through which data communications are delivered to target endpoints deterministically, that is, in the same order in which the communications are transmitted from origin endpoints. The endpoints (352, 354) can be located on the same compute node where a segment of memory is shared locally, although readers will recognize that a source endpoint and a target endpoint in a data processing environment that includes a Non-Uniform Memory Access ('NUMA') architecture can be located on different compute nodes.

The method of FIG. 12 includes receiving (364) in an origin endpoint (352) of a PAMI (218) a DMA GET instruction (390). The GET instruction specifies a GET-type data transfer from the target endpoint (354) to the origin endpoint (352). The target application (158) previously placed a quantity of transfer data (494) at a location in its RAM (156) and provided a data descriptor to its DMA controller (226), placing the transfer data (454) into the segment (227) of shared memory. The GET instruction (446) then is received in the origin endpoint (352) through operation of a post function (480) called by the originating application (158) on a context (512) of the origin endpoint (352), posting the GET instruction (446) to a work queue (282) of the context (512). The GET instruction (446) specifies a data transfer from the target endpoint (354) to the origin endpoint (352) as well as source and destination memory locations, and the GET instruction also specifies a GET done callback function (447), which is registered in the PAMI (218) for later use. The application's post of the GET instruction is non-blocking, so that the application continues other work while the PAMI executes the GET instruction. Later, the PAMI will use the GET done callback to advise the originating application (158) of completion of the GET transfer.

The method of FIG. 14 also includes transferring (428, 450), by the origin endpoint through the segment of shared memory (227), transfer data (454) from the target endpoint (354) to the origin endpoint (352). The origin advance function (482), routinely called by the origin application (158) to advance work on its context (512), finds the GET function (446) in its work queue (282) and processes the GET instruction by providing to its DMA controller (225) a receive data descriptor (e.g., 234 on FIG. 8A), transferring (450, 454, 494) the transfer data from the segment of shared memory to receiving memory (155) of the originating application (158).

The method of FIG. 14 also includes executing (430, 456) by the origin endpoint (352) the GET done callback function (447). The origin-side DMA controller advises, with a receive data descriptor (236 on FIG. 8A), the advance function (482) of completion of the data transfer (454). Then the advance function (482) calls (456) the previously-registered GET done callback function (447), advising the originating application (158) of the arrival of the transfer data (494).

The method of FIG. 12 also includes receiving (378) in the origin endpoint (352) a FENCE instruction (448) directed particularly to GET operations between the origin endpoint (352) and the target endpoint (354). The FENCE instruction (448) is received in the origin endpoint (352) through operation of a post function (480) called by an application (158) on a context (512) of the origin endpoint (352), posting the FENCE instruction (448) to a work queue of the context (512). The FENCE instruction specifies a FENCE done callback function (449) which is registered in the PAMI for later use. The application's post of the FENCE instruction is non-blocking, so that the application continues other work while the PAMI executes the FENCE instruction. It is typical of a calling application (158), after issuing the FENCE instruction by posting it to a context, to cease further GET operations between the two endpoints that are the subject of the FENCE until completion of all GET data transfers previously initiated between the two endpoints—signified by completion of the FENCE—signified by the execution (470) of a FENCE done callback (449) advising the calling application (159) that the FENCE has completed. It is not a function of the FENCE to block GET operations between the endpoints until completion of the FENCE; the application itself must provide this function, and messaging will probably continue between other endpoints on behalf of the same application. On the other hand, most applications behave this way because it is in the application's interest to know by the FENCE when all GET transfers between those two particular endpoints have completed; that is the purpose of the FENCE call in the first place.

The method of FIG. 14 also includes transmitting (434, 458), after completion of all GET data transfers previously initiated between the two endpoints, the FENCE instruction (448) through the segment (227) of shared memory from the origin endpoint (352) to the target endpoint (354). The method of FIG. 14 also includes transmitting (434, 458), after completion of all GET data transfers previously initiated between the two endpoints, the FENCE instruction (448) through the segment (227) of shared memory from the origin endpoint (352) to the target endpoint (354). The FENCE instruction (448) was posted to the work queue of the context (512) of the origin endpoint (352) after the illustrated GET instruction (446), and, for that matter, after all previously posted GET instructions (not shown). The FENCE instruction (448) is transmitted by action of an advance function (482) called on a context (512) of the origin endpoint (352), the context in which the FENCE instruction was posted. The advance functions (482, 483) in the PAMI (218) deterministically advance work in work queues of contexts in the PAMI, so that the instructions in the queues are implemented or executed in the order in which they were posted to the work queues. The advance function (482) in the origin endpoint (352), therefore, begins execution of the FENCE instruction (448) providing an injection data descriptor (234 on FIG. 8A) to its DMA controller (225), sending (458) the FENCE instruction through the segment of shared memory and the target DMA controller to the target RAM, where it is found by the target advance function (483) at a memory location specified by a receive data descriptor of the target DMA controller. The transmission (434, 458) of the FENCE instruction, however, occurs only after completion of the GET instruction (446), including the data transfer (454) and execution (430, 456) of the GET done callback (447). The example of FIGS. 14 and 15, for ease of illustration, shows only one GET instruction (446) and only one data transfer (454), although readers will recognize that PAMI fencing of GET data transfers according to embodiments of the present invention are often directed to many GETs and many data transfers, all of which must complete before the FENCE completes. In deterministic execution, the FENCE instruction (448) is not taken from a work queue for execution until after all previously initiated GETs and their data transfers are fully processed.

The method of FIG. 12 also includes processing (436, 466) the FENCE instruction (392) by the target endpoint (354). The FENCE instruction (448) specifies a FENCE dispatch callback function, and processing (436, 466) the FENCE instruction includes executing the FENCE dispatch callback function (402) and advising (468, 412, 469) the origin endpoint (352) of the processing of the FENCE instruction. On the target side of the transfer, an advance function (483) of the target endpoint (354) finds in its DMA controller (226) a receive data descriptor (236 on FIG. 8A) specifying the location of the FENCE instruction in RAM (156) on the target side. The advance function (483) retrieves the FENCE instruction and executes its dispatch callback (402), which in turn advises the origin endpoint of the processing of the FENCE instruction. The advance function (482) on the origin endpoint (352) assigned a sequence number to the FENCE instruction (448), and the advance function (483) on the target endpoint (354) increments (468) a counter (412) in shared memory (227) to indicate the sequence number of the FENCE instruction as the last message processed by the advance function (483) of the target endpoint. Thus the advance function (482) in the origin endpoint (352), which reads (469) the counter (412) as part of its processing, is advised of the completion of the processing of the FENCE instruction.

The method of FIG. 14 also includes executing (442, 470) by the origin endpoint (352) the FENCE done callback function (449), which was registered in the PAMI (218) earlier when execution of the FENCE (448) first began. That is, the advance function (482) called by an application (158) or an application messaging module on a context (512) of the origin endpoint (352), routinely monitors its assigned data communications resources, including reading (469) the counter (412) for the sequence number of the last processed message. The advance function (482) matches the counter value as read (469) with the sequence number of the FENCE instruction (448), signifying full completion of the FENCE instruction, and calls the appropriate FENCE done callback (449) previously registered with the PAMI (218).

In view of the explanations set forth above, readers will recognize that the benefits of fencing DMA data transfers in a PAMI of a parallel computer according to embodiments of the present invention include a new fence protocol that provides low-latency, eliminates data communications congestion due to the fence, and eliminates the need for counter arrays. Indeed, fencing data transfers according to embodiments of the present invention is carried out without maintaining any status information whatsoever on fenced data transfer messages, either DMA messages or their transfers of data.

Example embodiments of the present invention are described largely in the context of a fully functional parallel computer that fences data transfers in a parallel active messaging interface ('PAMI'). Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of fencing direct memory access ('DMA') data transfers in a parallel active messaging interface ('PAMI') of a parallel computer, the parallel computer comprising a plurality of compute nodes that execute a parallel application, the PAMI comprising data communications endpoints, the compute nodes and the endpoints coupled for data communications through the PAMI and through data communications resources including DMA controllers operatively coupled to segments of shared random access memory through which the DMA controllers deliver data communications deterministically, in the same order in which the communications are transmitted, the method comprising:

initiating execution through the PAMI of an ordered sequence of active DMA instructions for DMA data transfers between two endpoints, an origin endpoint and a target endpoint, each DMA instruction effecting a deterministic DMA data transfer through a DMA controller and a segment of shared memory in which the DMA data transfers are effected according to the ordered sequence of the DMA instructions; and executing through the PAMI, with no FENCE accounting for DMA data transfers, an active FENCE instruction, the FENCE instruction completing execution only after completion of all DMA instructions initiated prior to execution of the FENCE instruction for DMA data transfers between the two endpoints.

2. The method of claim 1 wherein:

each endpoint comprises a specification of data communications parameters for a thread of execution on a compute node, including specifications of a client, a context, and a task;

each client comprises a collection of data communications resources dedicated to the exclusive use of an application-level data processing entity;

each context comprises a subset of the collection of data processing resources of a client, context functions, and a work queue of data transfer instructions to be performed by use of the subset through the context functions operated by an assigned thread of execution; and each task represents a process of execution of the parallel application.

3. The method of claim 1 wherein each context carries out, through post and advance functions, data communications for the parallel application on data communications resources in the exclusive possession of that context.

4. The method of claim 1 wherein each context carries out data communications operations independently and in parallel with other contexts.

5. The method of claim 1 wherein the DMA instructions comprise DMA PUT instructions, and executing a FENCE instruction further comprises:

receiving in the origin endpoint the FENCE instruction, the FENCE instruction specifying a FENCE done callback function;

transmitting the FENCE instruction through the segment of shared memory from the origin endpoint to the target endpoint, the FENCE instruction specifying a FENCE dispatch callback function;

processing, by the target endpoint after completion of all PUT data transfers previously initiated between the two endpoints, the FENCE instruction, including executing the FENCE dispatch callback function and advising the origin endpoint of the processing of the FENCE instruction; and executing by the origin endpoint the FENCE done callback function.

6. The method of claim 1 wherein the DMA instructions comprise DMA GET instructions, and executing a FENCE instruction further comprises:

receiving in the origin endpoint the FENCE instruction, the FENCE instruction specifying a FENCE done callback function;

transmitting, after completion of all GET data transfers previously initiated between the two endpoints, the FENCE instruction through the segment of shared memory from the origin endpoint to the target endpoint, the FENCE instruction specifying a FENCE dispatch callback function;

processing the FENCE instruction by the target endpoint, including executing the FENCE dispatch callback function and advising the origin endpoint of the processing of the FENCE instruction; and executing by the origin endpoint the FENCE done callback function.

7. A parallel computer that fences direct memory access ('DMA') data transfers in a parallel active messaging interface ('PAMI'), the parallel computer comprising a plurality of compute nodes that execute a parallel application, the PAMI comprising data communications endpoints on the compute nodes of the parallel computer, the compute nodes and the endpoints coupled for data communications through the PAMI and through data communications resources including DMA controllers operatively coupled to segments of shared random access memory through which the DMA controllers deliver data communications deterministically, in the same order in which the communications are transmitted, the compute nodes comprising computer processors operatively coupled to computer memory having disposed within it computer program instructions that, when executed by the computer processors, cause the parallel computer to function by:

initiating execution through the PAMI of an ordered sequence of active DMA instructions for DMA data transfers between two endpoints, an origin endpoint and a target endpoint, each DMA instruction effecting a deterministic DMA data transfer through a DMA controller and a segment of shared memory in which the DMA data transfers are effected according to the ordered sequence of the DMA instructions; and executing through the PAMI, with no FENCE accounting for DMA data transfers, an active FENCE instruction, the FENCE instruction completing execution only after completion of all DMA instructions initiated prior to execution of the FENCE instruction for DMA data transfers between the two endpoints.

8. The parallel computer of claim 7 wherein:

each endpoint comprises a specification of data communications parameters for a thread of execution on a compute node, including specifications of a client, a context, and a task;

each client comprises a collection of data communications resources dedicated to the exclusive use of an application-level data processing entity;

each context comprises a subset of the collection of data processing resources of a client, context functions, and a work queue of data transfer instructions to be performed by use of the subset through the context functions operated by an assigned thread of execution; and each task represents a process of execution of the parallel application.

9. The parallel computer of claim 7 wherein each context carries out, through post and advance functions, data communications for the parallel application on data communications resources in the exclusive possession of that context.

10. The parallel computer of claim 7 wherein each context carries out data communications operations independently and in parallel with other contexts.

11. The parallel computer of claim 7 wherein the DMA instructions comprise DMA PUT instructions, and executing a FENCE instruction further comprises:

receiving in the origin endpoint the FENCE instruction, the FENCE instruction specifying a FENCE done callback function;

transmitting the FENCE instruction through the segment of shared memory from the origin endpoint to the target endpoint, the FENCE instruction specifying a FENCE dispatch callback function;

processing, by the target endpoint after completion of all PUT data transfers previously initiated between the two endpoints, the FENCE instruction, including executing the FENCE dispatch callback function and advising the origin endpoint of the processing of the FENCE instruction; and executing by the origin endpoint the FENCE done callback function.

12. The parallel computer of claim 7 wherein the DMA instructions comprise DMA GET instructions, and executing a FENCE instruction further comprises:

receiving in the origin endpoint the FENCE instruction, the FENCE instruction specifying a FENCE done callback function;

transmitting, after completion of all GET data transfers previously initiated between the two endpoints, the FENCE instruction through the segment of shared memory from the origin endpoint to the target endpoint, the FENCE instruction specifying a FENCE dispatch callback function;

processing the FENCE instruction by the target endpoint, including executing the FENCE dispatch callback function and advising the origin endpoint of the processing of the FENCE instruction; and executing by the origin endpoint the FENCE done callback function.

13. A computer program product for fencing direct memory access ('DMA') data transfers in a parallel active messaging interface ('PAMI') of a parallel computer, the parallel computer comprising a plurality of compute nodes that execute a parallel application, the PAMI comprising data communications endpoints on the compute nodes of the parallel computer, the compute nodes and the endpoints coupled for data communications through the PAMI and through data communications resources including DMA controllers operatively coupled to segments of shared random access memory through which the DMA controllers deliver data communications deterministically, in the same order in which the communications are transmitted, the computer program product disposed upon a non-transitory computer readable medium, the computer program product comprising computer program instructions that, when installed and executed, cause the parallel computer to function by:

initiating execution through the PAMI of an ordered sequence of active DMA instructions for DMA data transfers between two endpoints, an origin endpoint and a target endpoint, each DMA instruction effecting a deterministic DMA data transfer through a DMA controller and a segment of shared memory in which the DMA data transfers are effected according to the ordered sequence of the DMA instructions; and executing through the PAMI, with no FENCE accounting for DMA data transfers, an active FENCE instruction, the FENCE instruction completing execution only after completion of all DMA instructions initiated prior to execution of the FENCE instruction for DMA data transfers between the two endpoints.

14. The computer program product of claim 13 wherein:

each endpoint comprises a specification of data communications parameters for a thread of execution on a compute node, including specifications of a client, a context, and a task;

each client comprises a collection of data communications resources dedicated to the exclusive use of an application-level data processing entity;

each context comprises a subset of the collection of data processing resources of a client, context functions, and a work queue of data transfer instructions to be performed by use of the subset through the context functions operated by an assigned thread of execution; and each task represents a process of execution of the parallel application.

15. The computer program product of claim 13 wherein each context carries out, through post and advance functions, data communications for the parallel application on data communications resources in the exclusive possession of that context.

16. The computer program product of claim 13 wherein each context carries out data communications operations independently and in parallel with other contexts.

17. The computer program product of claim 13 wherein the DMA instructions comprise DMA PUT instructions, and executing a FENCE instruction further comprises:

receiving in the origin endpoint the FENCE instruction, the FENCE instruction specifying a FENCE done callback function;

transmitting the FENCE instruction through the segment of shared memory from the origin endpoint to the target endpoint, the FENCE instruction specifying a FENCE dispatch callback function;

processing, by the target endpoint after completion of all PUT data transfers previously initiated between the two endpoints, the FENCE instruction, including executing the FENCE dispatch callback function and advising the origin endpoint of the processing of the FENCE instruction; and executing by the origin endpoint the FENCE done callback function.

18. The computer program product of claim 13 wherein the DMA instructions comprise DMA GET instructions, and executing a FENCE instruction further comprises:

receiving in the origin endpoint the FENCE instruction, the FENCE instruction specifying a FENCE done callback function;

transmitting, after completion of all GET data transfers previously initiated between the two endpoints, the FENCE instruction through the segment of shared memory from the origin endpoint to the target endpoint, the FENCE instruction specifying a FENCE dispatch callback function;

processing the FENCE instruction by the target endpoint, including executing the FENCE dispatch callback function and advising the origin endpoint of the processing of the FENCE instruction; and executing by the origin endpoint the FENCE done callback function.

* * * * *